US012700769B2

(12) United States Patent　　　　　(10) Patent No.: US 12,700,769 B2
Kesler　　　　　(45) Date of Patent: Aug. 4, 2026

(54) FLYWHEEL SYSTEMS WITH MULTIPLE GENERATOR COILS

(71) Applicant: MATTUR, LLC, Scottsdale, AZ (US)

(72) Inventor: Kris Kesler, Paradise Valley, AZ (US)

(73) Assignee: MATTUR HOLDINGS, INC., Scottsdale, AZ (US)

( * ) Notice: Subject to any disclaimer, the term of this patent is extended or adjusted under 35 U.S.C. 154(b) by 609 days.

(21) Appl. No.: 18/076,632

(22) Filed: Dec. 7, 2022

(65) Prior Publication Data

US 2023/0179061 A1　　Jun. 8, 2023

Related U.S. Application Data

(60) Provisional application No. 63/286,761, filed on Dec. 7, 2021.

(51) Int. Cl.
　　*H02K 7/02*　　　(2006.01)
　　*H02K 21/24*　　(2006.01)
(52) U.S. Cl.
　　CPC ............... *H02K 7/02* (2013.01); *H02K 21/24* (2013.01)
(58) Field of Classification Search
　　CPC .......... H02K 7/02; H02K 7/025; H02K 21/24; H02K 11/33; H02K 11/30; F03G 3/08; F03G 3/083; F03G 3/087; F03G 3/091; F03G 3/094
　　USPC ......................................................... 310/74
　　See application file for complete search history.

(56) References Cited

U.S. PATENT DOCUMENTS

| | | | |
|---|---|---|---|
| 5,514,923 A | 5/1996 | Gossler et al. | |
| 2005/0140231 A1 | 6/2005 | Ogoshi | |
| 2007/0228853 A1* | 10/2007 | Wise .................... | H02K 49/108 310/80 |
| 2008/0088200 A1* | 4/2008 | Ritchey .................. | H02K 21/12 310/112 |
| 2014/0300227 A1* | 10/2014 | Kalev ..................... | F16H 33/02 310/74 |
| 2015/0188317 A1* | 7/2015 | Ritchey .................. | F03D 9/255 307/82 |
| 2018/0109166 A1* | 4/2018 | Martin ................... | H02K 11/21 |
| 2019/0081582 A1 | 3/2019 | Rozman | |
| 2020/0243236 A1 | 7/2020 | Yasuko | |

OTHER PUBLICATIONS

Preliminary Report on Patentability for related International Application No. PCT/US22/81062; action dated Jun. 20, 2024; (8 pages).
(Continued)

*Primary Examiner* — Michael Andrews
(74) *Attorney, Agent, or Firm* — K&L Gates LLP

(57)　　　　　ABSTRACT

Flywheel systems with multiple generator coils are provided with a rotor disk configured to rotate about a rotational axis; a plurality of magnets disposed in the rotor disk, the plurality of magnets angularly distributed around the rotational axis, and the plurality of magnets magnetically aligned such that respective magnetic north poles of each magnet of the plurality of magnets face a same direction; and a coil disposed adjacent to the rotor disk, the coil extending axially away from the rotor disk, and the coil positioned to sequentially overlap each magnet of the plurality of magnets in response to rotation of the rotor disk about the rotational axis.

21 Claims, 20 Drawing Sheets

(56) References Cited

OTHER PUBLICATIONS

Notice of Publication for related Mexican Application No. MX/a/ 2024/007007; action dated Aug. 12, 2024; (2 pages).
International Search Report and Written Opinion for related International Application No. PCT/US22/81062; action dated Mar. 10, 2023; (10 pages).

* cited by examiner

200

236

228

218

216

214

212

210

232

220

230

500/
260

560

530

550

502

600
602
604
606
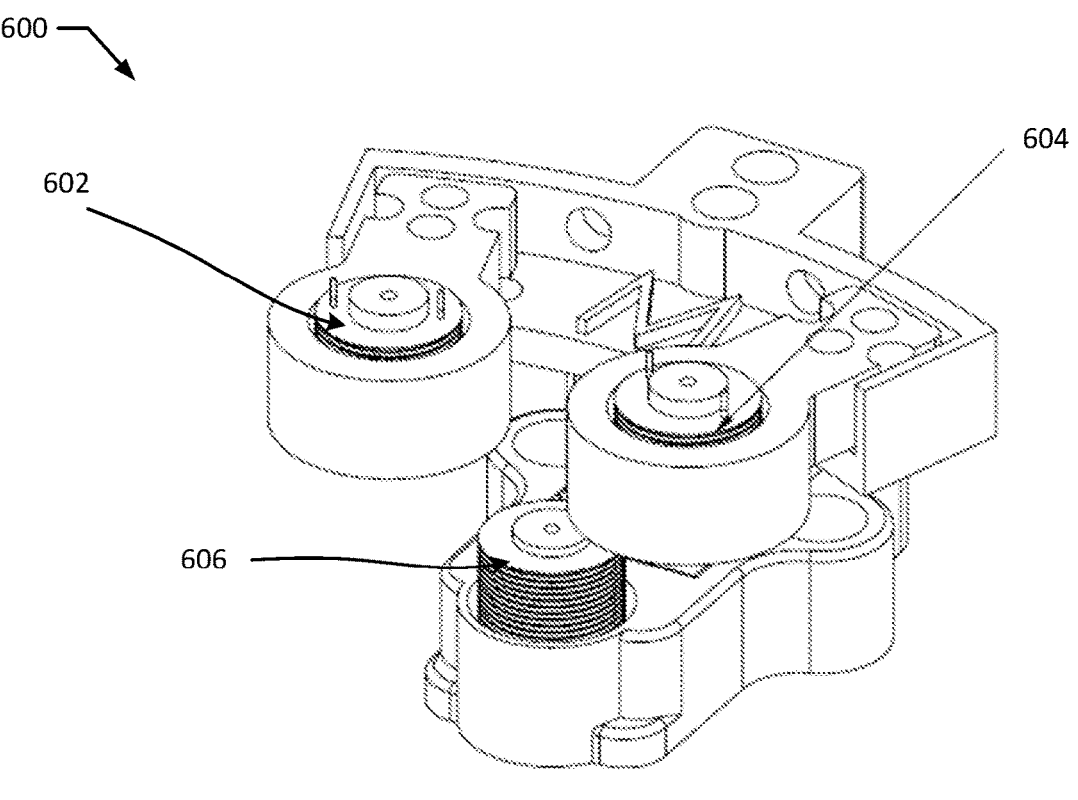
FIG. 6A
600
600
602
606
604
606
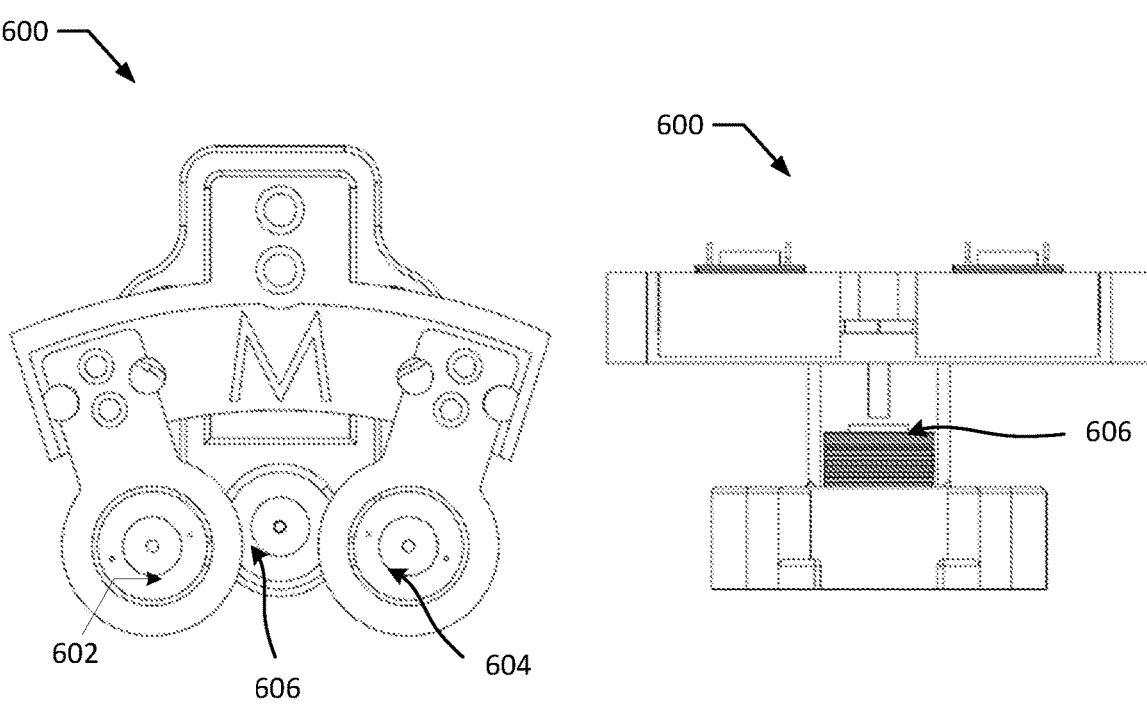
FIG. 6B
FIG. 6C 800a

FLYWHEEL SYSTEMS WITH MULTIPLE GENERATOR COILS

CROSS-REFERENCES TO RELATED APPLICATIONS

The present disclosure claims priority to U.S. Provisional Patent Application No. 63/286,761 filed on Dec. 7, 2021 entitled, "FLYWHEEL SYSTEMS WITH MULTIPLE GENERATOR COILS", which is incorporated herein in its entirety.

BACKGROUND

Generators may be used to generate electricity by converting motive power (i.e., mechanical energy) into electrical power. Some generators may produce electricity by rotating a rotor relative to a stator to provide a varying magnetic field at the stator. The varying magnetic field may then be used to induce an electric current (e.g., via a coil, etc.) in the stator.

A flywheel may be used to store energy in the form of rotational kinetic energy by rotating a rotor of the flywheel. In some flywheels, an amount of stored rotational energy in a flywheel may be related to a moment of inertia of the rotor and a rotational speed of the rotor. For example, an amount of energy stored in a flywheel may sometimes be increased by increasing a rotation speed of a rotor of the flywheel. The stored energy can then be extracted from the rotor at a later time, for example, to drive a rotor of a generator or some other system that can use or convert the motive power from the rotating rotor of the flywheel.

SUMMARY

The present disclosure provides new and innovative systems, devices, and methods for improved power generation and energy storage.

In one example, the present disclosure provides a device comprising: a rotor disk configured to rotate about a rotational axis; a plurality of magnets disposed in the rotor disk, the plurality of magnets angularly distributed around the rotational axis, and the plurality of magnets magnetically aligned such that respective magnetic north poles of each magnet of the plurality of magnets face a same direction; and a coil disposed adjacent to the rotor disk, the coil extending axially away from the rotor disk, and the coil positioned to sequentially overlap each magnet of the plurality of magnets in response to rotation of the rotor disk about the rotational axis.

In one example, the present disclosure provides a system comprising: one or more rotor disks configured to rotate about a rotational axis, wherein each of the one or more rotor disks includes a respective plurality of magnets angularly distributed about the rotational axis; a plurality of coils, each respective coil of the plurality of coils positioned when overlapping one magnet of the plurality of magnets on a respective rotor disk of the one or more rotor disks to be within a magnetic gap threshold of the one magnet, the respective coil extending axially from a proximal end of the respective coil facing the respective disk to a distal end of the respective coil opposite the proximal end; a load bus configured to transport electrical power; a plurality of switches, each of the plurality of switches having a respective switch output that is electrically connected to the load bus; and a controller coupled to the plurality of switches and configured to selectively connect at least one of the plurality of coils to the load bus by operating the plurality of switches.

In one example, the present disclosure provides a system, comprising: a plurality of rotor disks, including: a first rotor disk including a first plurality of magnets angularly distributed relative to a rotation axis; a second rotor disk including a second plurality of magnets angularly distributed relative to the rotation axis; a plurality of coils, including: a first coil positioned to be within a magnetic gap distance of each magnet of the first plurality of magnets; and a second coil positioned to be within the magnetic gap distance of each magnetic of the second plurality of magnets; and wherein the first rotor disk and the first coil are positioned relative to the second rotor disk and the second coil to sequentially overlap the first plurality of magnets with the first coil relative overlapping the second plurality of magnets with the second coil while rotating the first rotor disk and the second rotor disk at shared rotational speed about the rotation axis.

The examples, features, and advantages described above are not all-inclusive and, in particular, many additional examples, arrangements, features, and advantages will be apparent to one of ordinary skill in the art in view of the figures and description in the present disclosure. Moreover, it should be noted that the language used in the specification has been principally selected for readability and instructional purposes, and not to limit the scope of the disclosed subject matter.

BRIEF DESCRIPTION OF THE FIGURES

FIGS. 6A-6C illustrate another example stator configured for supporting coils facing two sides of a stator disk, according to an example embodiment.

DETAILED DESCRIPTION OF EXAMPLE EMBODIMENTS

Some conventional flywheel designs may use a motor-generator to store energy by operating the motor-generator as a motor, and to extract energy by operating the motor-generator as a generator. However, in some scenarios, a certain magnetic circuit configuration (e.g., number of coil turns, magnetic circuit geometry, coil combination, rotor rotation speed, etc.) may be more suitable for a motor than a generator, and vice versa.

For example, it may be more efficient to use a smaller size or number of coil(s) when generating electricity during low load level periods than during high load level periods. For instance, in some scenarios, if power output from a flywheel closely matches current requirements, less power might be dissipated (e.g., by power electronics such as regulators, etc.) than if there were a relatively more significant mismatch. As another example, a particular magnetic circuit configuration (e.g., coil size, air gap, flux density, magnet strength, etc.) might be more optimal or efficient (e.g., by capturing a suitable density of magnetic flux in a coil, etc.) than a single magnetic circuit configuration (e.g., motor-generator) or other system that can only provide a single or a limited number of outputs and/or configurations.

To that end, example systems and devices are disclosed herein that advantageously enable more efficient, flexible, selective, customizable, intelligent, and/or otherwise improved flywheel and generator systems and operations.

Figure 1A:
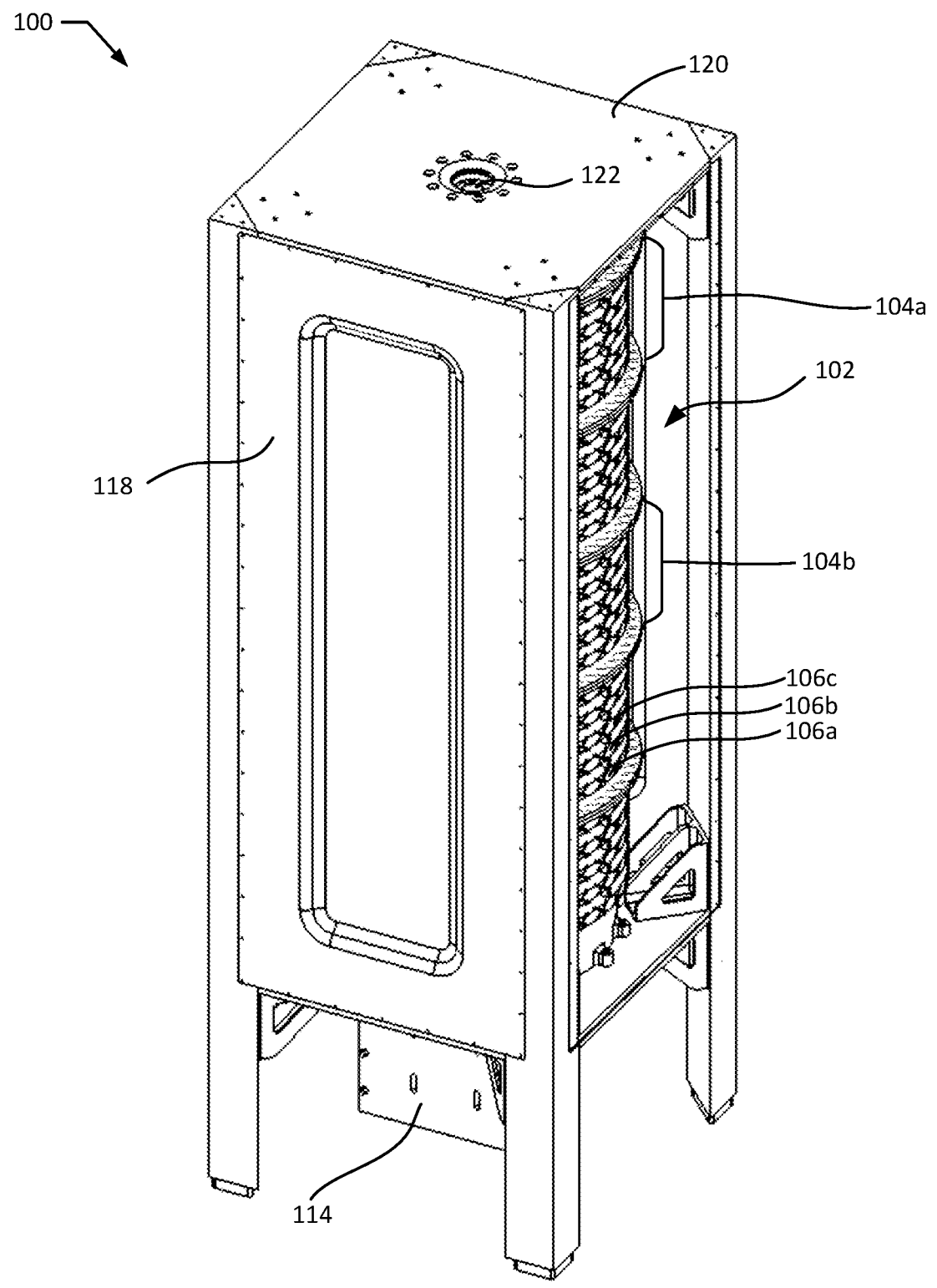
FIGS. 1A-1C illustrate an example system for energy storage and power generation, according to an example embodiment.
Figure 1B:
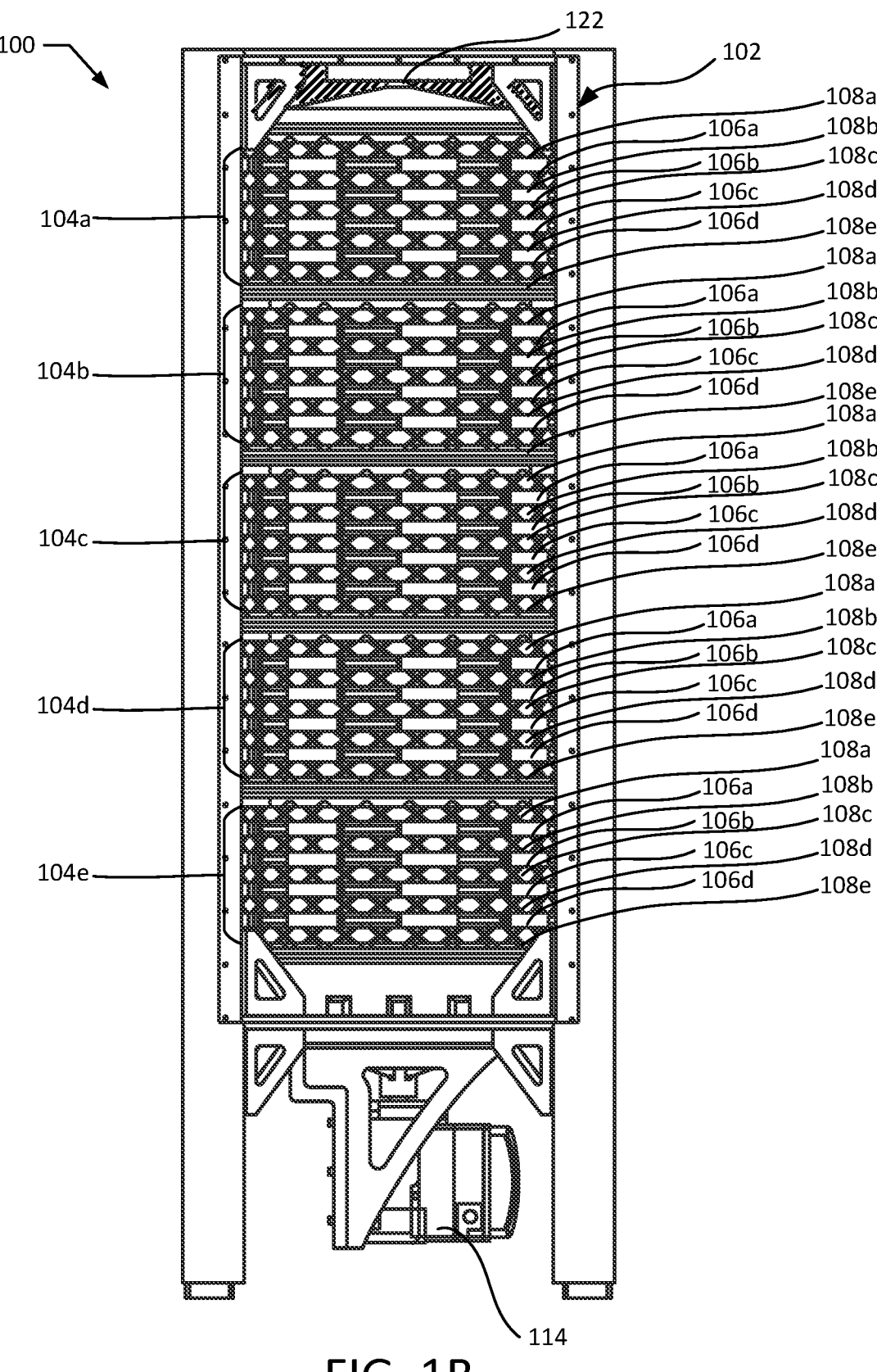
Figure 1C:
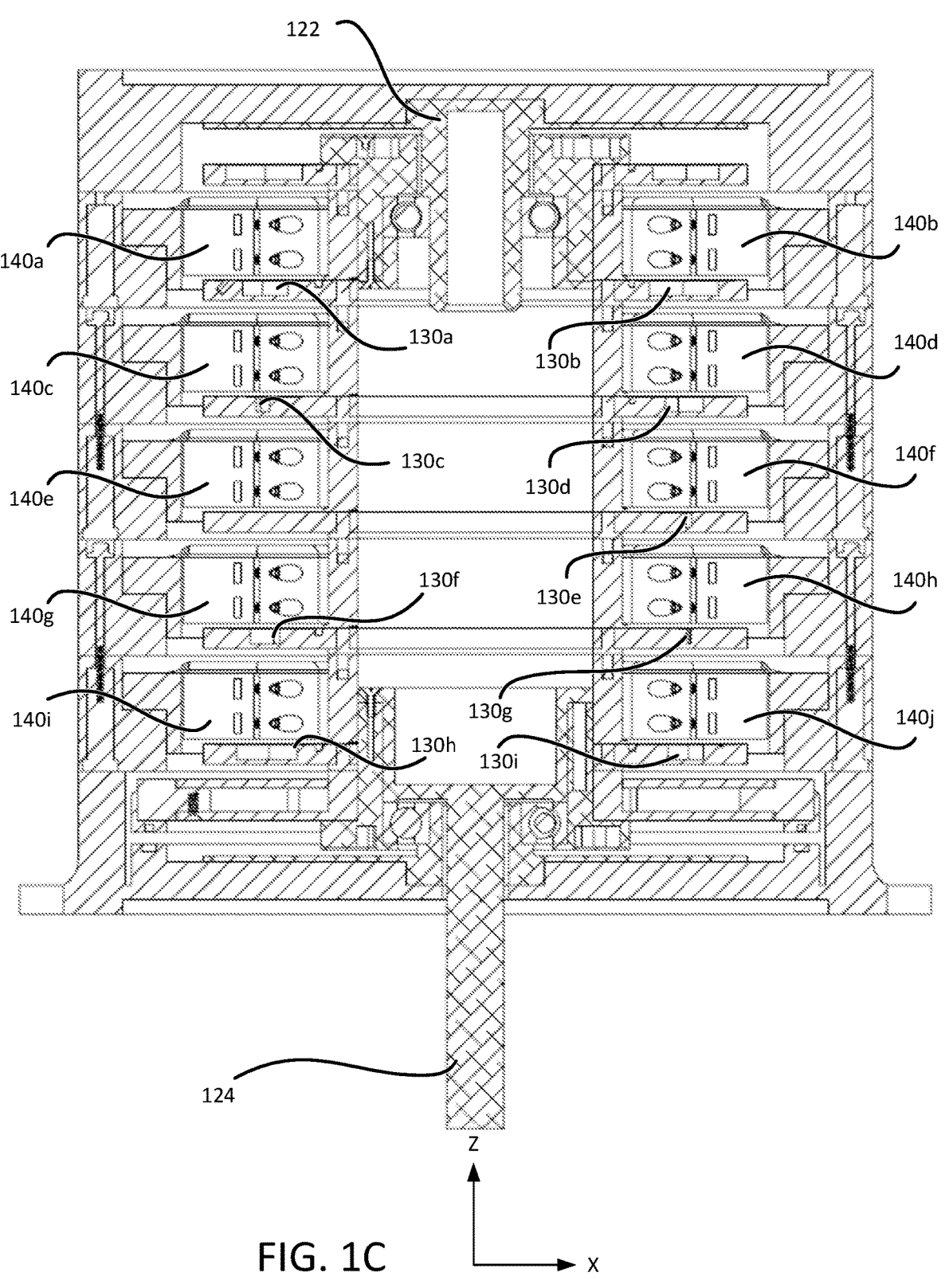

FIGS. 1A-1C illustrate a system 100 for generating electricity, according to an exemplary embodiment of the present disclosure. FIG. 1A depicts a perspective view of the system 100 and FIG. 1B depicts a side view of the system 100. In an example, the system 100 includes a generator. In an example, the system 100 includes a flywheel 102, which rotates to store energy and/or to generate power output by the system 100. The generated power is provided to an electrical load (not shown) of the system 100. In certain implementations, the flywheel 102 is oriented vertically within the system 100 as depicted. In other implementations, the flywheel 102 may be oriented horizontally within the system 100. Other orientations of the system 100 are possible as well. Rotation of the flywheel 102 is driven at least in part by a prime mover 114. Accordingly, although various examples are provided with relative locational terms that relate to a vertical orientation of the flywheel 102, one of ordinary skill in the art will be able to reorient the locational terms in the examples based on a horizontal or other orientation (e.g., between fully vertical and fully horizontal) of the system 100.

In the illustrated example, the prime mover 114 is a motor. In some examples, the prime mover 114 may alternatively be implemented as any type of device configured to transfer kinetic rotational motion to the flywheel 102. In an example, the prime mover 114 may be implemented as a wind energy system that transfers a rotational motion (e.g., via gears) of blades of a windmill to rotate the flywheel 102. Additionally or alternatively, in an example, the prime mover 114 may include a gear system coupled to a water turbine which generates the rotational motion based on flow of water through the water turbine. Other types of prime movers 114 are possible as well. However, for the sake of example, the prime mover 114 in the example of FIG. 1 is a motor (e.g., electric motor, combustion engine, etc.) and may be referred to as the prime mover or motor 114 interchangeably in the examples given herein.

The motor 114 may be positioned near one end of the flywheel 102. For example, as depicted, the motor 114 may be positioned at a bottom end of the system 100. In an example, the motor 114 is used to initialize rotation of the flywheel 102. In additional or alternative implementations, the motor 114 may continue to power the rotation of the flywheel 102 after initializing. In various embodiments, the prime mover or motor 114 may be powered from an alternative energy source, such as fossil fuels, solar power, wind power, or any other energy source, and enables the system 100 to operate as a generator in addition to or alternatively to acting as a power storage solution.

In one embodiment, the flywheel 102 is formed from one or more flywheel sections 104a-b (generally or collectively, flywheel sections 104; only a subset of which are numbered in FIG. 1A). The flywheel sections 104 are formed from one or more rotor disks 106a-c (generally or collectively, rotor disks 106; only a subset of which are numbered in FIG. 1A). In various examples, the flywheel 102 may include any number of disks (and/or stator/rotor levels). For example, the flywheel sections 104. may be configured in a modular manner so that additional or fewer flywheel sections 104 can be easily mounted on top of one another to increase or decrease a power capacity of the flywheel 102. The rotor disks 106 include magnets that are positioned near an outer edge of the disks or otherwise angularly distributed around a rotation axis or rotor axis of the rotor disks 106. In various embodiments, the magnets are positioned adjacent to the outer edge of the disks, but are fully positioned within the outer edge. In some embodiments, the magnets are positioned to overhang the outer edge of the disks such that at least a portion of each magnet extends past the outer edge.

As used herein, the term "adjacent to" (and variations thereof) refers to a relationship between two components that indicates that the two components are positioned to be in a range of one another such that the first component may be within physical contact (e.g., zero distance) up to one body length away from the second component. The body length of the components is to be understood as the larger of the two values of the components in the plane in which the components are judged to be adjacent to one another. For example, a first circular magnet of diameter (e.g., body length) of 1 centimeter (cm) is considered to be adjacent to a second circular magnet in the same XY plane that has a 2 cm diameter when the first circular magnet and the second circular magnet are positioned within 0-2 cm of each other. In another example, a first magnet of a diameter of 1 cm and a height 0.25 cm is considered to be adjacent to a third magnet in a different XY plane having a diameter of 1 cm and a height of 0.125 cm when the first magnet 910a is located between 0-0.25 cm from the third magnet.

In some examples, stator disks containing coils of wire are positioned between the rotor disks 106. When the flywheel 102 is rotated, the rotor disks 106, rotate between the stator disks, causing the magnets disposed thereon to induce an electric current in the coils of the stator disks, which is then output by the system 100. In some examples, the rotor disks 106 are substantially hollow in design, which reduces the overall weight of the flywheel 102. In some examples, the rotor disks 106 are formed from a material having sufficient mass to enable increasing a moment of inertia for the flywheel 102 during rotation of the rotor disks 106.

In an example, the flywheel sections 104a-b are joined together to form the flywheel 102. In this way, the flywheel sections 104a-b enable modular construction of the flywheel 102. Such modular construction allows for customizable design and/or assembly of generators configured for a particular power output. For example, rather than having to redesign a flywheel for larger power outputs, a larger flywheel can be constructed by combining additional flywheel sections 104a-n to create a longer/taller and larger flywheel capable of outputting more power.

In certain instances, electric current output by the system 100 is processed by a power converter (not shown). For example, the power converter receives current output by the system 100 and converts the current to power with one or more desired characteristics (e.g., desired voltage, desired Alternating Current (AC) frequency, desired phase, etc.). In one example, the power converter converts the power generated by the system 100 to a signal having a voltage between 100 Volts (V) to 120 V, and a 60 Hertz (Hz) frequency. In another example, the power converter converts the output power from the system 100 to a power signal having a voltage of 240 V, and a frequency of 50 Hz.

The system 100 also includes a top plate 120 and side plates 118. In an example, the top plate 120 may support the flywheel 102 during operation within the system 100. To facilitate this, in the illustrated example, the top plate 120 includes a bearing attachment point 122, from which the flywheel 102 may be suspended during operation. The attachment point 122 may include a magnetic bearing or any other type of bearing. The top plate 120 may also be configured to protect the system 100 and associated internal components, such as the flywheel 102 and the rotor disks 106. The side plates 118 may additionally or alternatively be positioned to protect internal components of the system 100 that are surrounded by the side plates 118. For example, once fully assembled, the system 100 may include side panels on all four sides of the system 100 (e.g., left, right, front, and back sides). As depicted, the system 100 may omit one of the side plates 118 to enable visibility of the internal components, such as the flywheel 102.

FIG. 1B illustrates a side view of the system 100 according to an exemplary embodiment of the present disclosure. As can be seen in the side view, the flywheel 102 includes five flywheel sections 104a-e (generally or collectively section 104). Each flywheel section 104 is made from four rotor disks 106a-d (generally or collectively, rotor disk 106) and five stator disks 108a-e (generally or collectively, stator disk 108). Each of the rotor disks 106 contains permanent magnets located near an outer edge of the respective disk 106. The stator disks 108 each contain coils of wire in which an electric current is induced by the magnets from the rotor disks 106 when the flywheel 102 rotates. The stator disks 108 are fixed to a housing of the system 100 and remain stationary when the flywheel 102 rotates.

The flywheel sections 104 are assembled by joining multiple rotor disks 106. In certain instances, stator disks 108 are positioned between the rotor disks 106 during assembly. For example, in certain implementations, each of the rotor disks 106 is spaced from a respective stator disk 108 such that the distance between the magnets in a rotor disk 106 and coils of wire in a neighboring stator disk 108 configured to be within a predetermined magnetic gap distance while the rotor disks 106 are rotating. The predetermined magnetic gap distance may vary based on the size and strength of the magnets, size of the coils, desired amount of current (in Amperes) to induce in the coils, etc. In various examples, the magnetic gap distance is less than or equal to 0.5 inches, less than or equal to 0.25 inches, less than or equal to 0.1 inches, and/or less than or equal to 0.05 inches.

As used herein, the term "neighboring" and variations thereof, when applied to members of a plurality of members refers to members that are considered to be immediately prior to or immediately subsequent to a referenced member, regardless of whether the members are in physical contact. For example, when considered in a vertical sequence, rotor disk 106b neighbors rotor disk 106a and rotor disk 106c, but rotor disk 106a does not neighbor rotor disk 106c (and vice versa) due to rotor disk 106b being located between rotor disk 106a and rotor disk 106c.

Assembled flywheel sections 104 are joined together to form a complete flywheel 102 for use within the system 100.

In certain implementations, each flywheel section 104 may be implemented as a discrete assembly capable of being independently added to or removed from the flywheel 102. For example, the rotor disks 106 are joined together to form an assembly capable of staying assembled when separated from other flywheel sections 104. In additional or alternative implementations, all flywheel sections 104 are assembled and stacked together before being joined as a single flywheel 102. In an example, the individual rotor disks 106 of the flywheel 102 can be fabricated separately (e.g., via 3D printing) and then attached to form a tree of rotor disks 106. In another example, a multi-layer rotor assembly (e.g., including all the rotor disks 106 in a flywheel section 104 or in the flywheel 102) may be fabricated as a single structure (e.g., via 3D printing).

FIG. 1C illustrates a cross-sectional view of an example system 100, according to embodiments of the present disclosure. As illustrated, a drive shaft 124 attached to the prime mover 114 is connected to a plurality of rotor disks that incorporate a plurality of magnets 130. When the prime mover 114 rotates the drive shaft 124 about the Z axis, the connected rotor disks and magnets also rotate about the Z axis. The rotor disks move relative to a plurality of stator disks and a plurality of coils 140a-j (generally or collectively, coils 140) incorporated into the stator disks to induce electrical currents in each of the coils 140. In various embodiments, the coils 140 may be wired together in various arrangements and controlled by various switches to selectively connect and disconnect to an electrical load, as is discussed in greater detail in regard to FIGS. 8A and 8B.

As illustrated in FIG. 1C, the stators are positioned in the system 100 such that each stator disk presents two coils 140 in the illustrated cross-section. In contrast, the various rotor disks are positioned with various angular offsets relative to one another so that various rotor disks present different portions of the magnets 130 (or different magnets 130) based on the differences in rotation of the rotor disks. As discussed in greater detail in regard to FIGS. 9A-9F, the angular offset provides for the sequential overlapping of the magnets 130 to the coils 140 when the flywheel rotates, such that the coils 140 defined at different levels of the assembly have currents induced therein at different times via the same rotation imparted to the stack of rotor disks and the associated magnets 130. In various embodiments, the magnets 130 may be various sizes and shapes, with different compositions depending on the size of the rotors, stators, designed speed of rotation, and designed electrical current to induce the coils 140. Similarly, the coils 140 may have different diameters, longitudinal lengths (e.g. based on the number of turns), and be made of gauges of wire, and the like, depending on the size of the rotors, stators, designed speed of rotation, and designed electrical current to induce the coils 140. These characteristics may be tuned according to Faraday's law to result in a current/voltage of a desired characteristics. For example, the magnets 130 have a magnetic strength of 1 kilogauss (kG) to 4 kG to induce an electrical current in the coils 140, which may be adjusted based on the speed of rotation of the rotors, the number of loops in the coils 140, the area of the coils 140 facing magnetic field of the magnets 130, etc. to yield power of a designated voltage or current.

It should be understood that the flywheel 102 depicted in FIGS. 1A-1C is merely exemplary, and additional or alternative flywheel designs, shapes, or arrangements, may be used in other implementations. For example, certain generators may use flywheels 102 containing more or fewer than five the flywheel sections 104a-e shown. For example, generators designed to output more power may include more flywheel sections (e.g., six or more flywheel sections). As another example, generators designed to output less power may include fewer flywheel sections (e.g., four or fewer flywheel sections). In still further implementations, the number of rotor disks 106 included in each flywheel section 104 may differ.

Certain configurations of the rotor disks 106 include magnets arranged to provide magnet propulsion as the flywheel rotates. In such instances, the number of rotor disks 106 may be selected to increase or maximize the magnetic propulsion while also balancing the number of magnets and coils of wire in the system 100. For example, certain implementations may include five rotor disks 106 in some flywheel sections 104 and/or three rotor disks 106 or other numbers of rotor disks in other flywheel sections 104. Further, the number of rotor disks 106 may differ for certain flywheel sections 104. For example, a first flywheel section 104a may include three rotor disks 106a-c, a second flywheel section 104b may include four rotor disks 106a-d, and a third flywheel section 104c may include five rotor disks 106a-e, etc.

The number of stator disks in the flywheel sections 104 may also differ in various implementations. In an example, a first rotor disk 106 may be magnetically coupled to a single stator disk 108 disposed within the magnetic gap threshold distance to the first rotor disk 106. In an example, a second rotor disk 106 may be magnetically coupled to two stator disks 108 disposed within the magnetic gap threshold distance to two opposite sides of the second rotor disk 106. Certain implementations may differ from the depicted configuration. For example, certain flywheels 102 may include the same number of rotor disks 106 and stator disks 108. As another example, certain flywheels may include fewer (e.g., one fewer) stator disks 108 than rotor disks 106 or fewer (e.g., one fewer) rotor disks 106 than stator disks 108.

To reduce friction, in some examples, the flywheel 102 may be suspended from a single point at the top and/or bottom of the system 100. In the illustrated example, the flywheel 102 is suspended from the bearing attachment point 122 (e.g., magnetic bearing) located on the top plate 120. In some examples, supporting the flywheel 102 in this manner may reduce overall friction imparted on the flywheel 102 while rotating, thereby increasing power output and efficiency of the system 100. In additional or alternative examples, the flywheel 102 may be supported at multiple points (e.g., supported by multiple bearings).

Figure 2A:
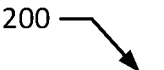
FIGS. 2A-2C illustrate an example device that includes a multi-layer rotor/stator assembly, according to an example embodiment.
Figure 2B:
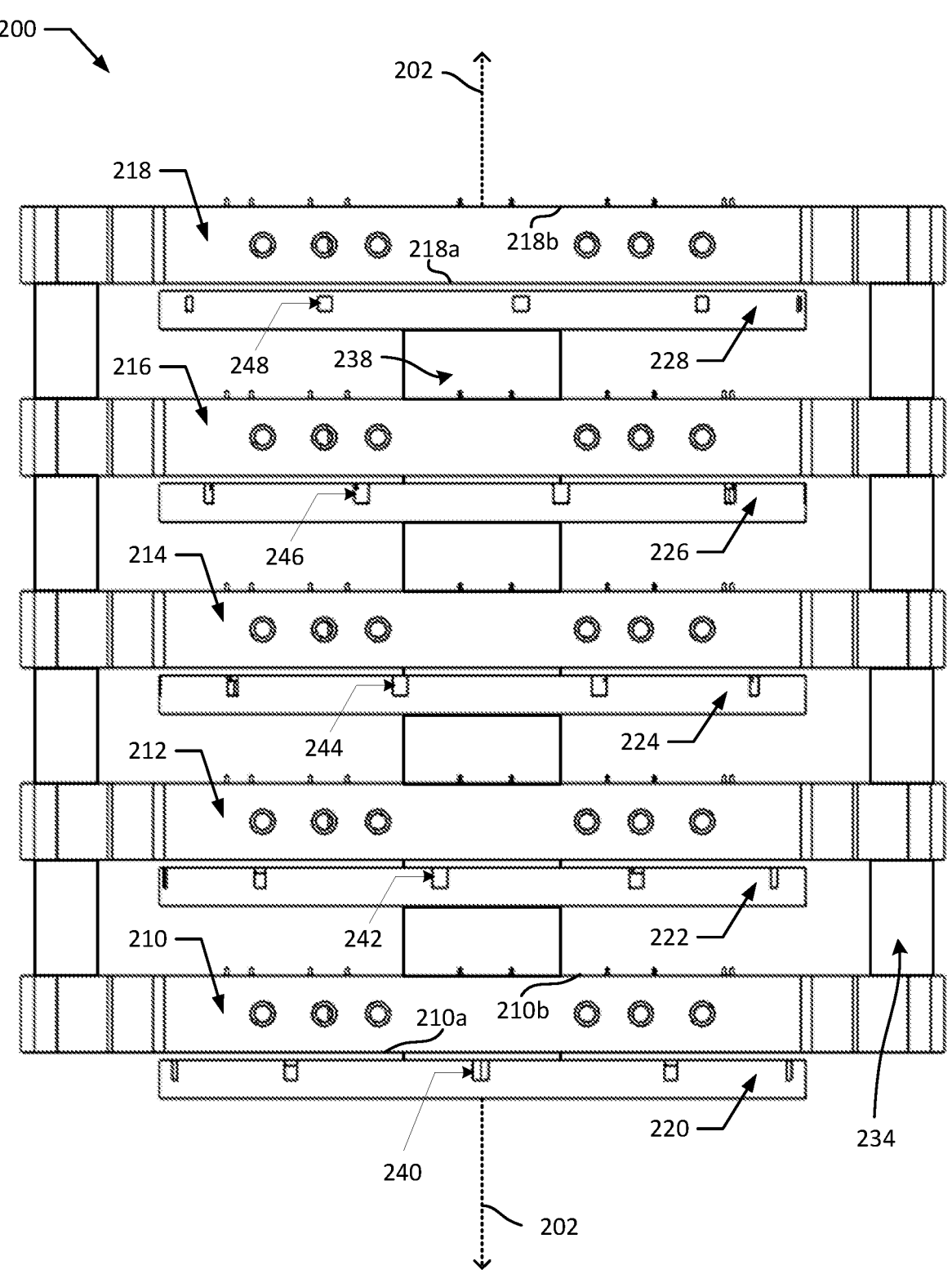
Figure 2C:
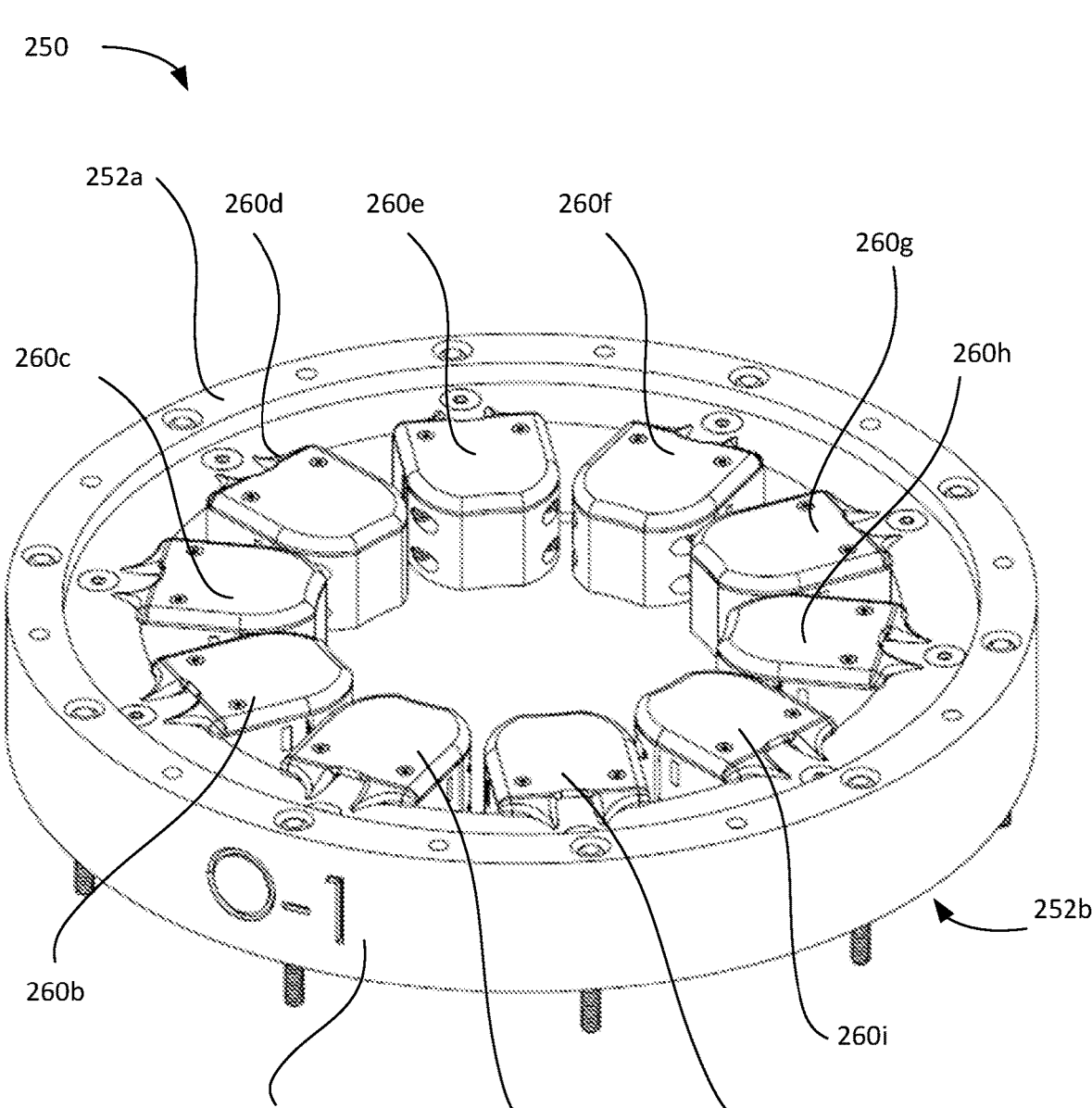

FIGS. 2A-2C illustrate an example device 200 that includes a multi-layer rotor/stator assembly, according to an example embodiment. For example, the device 200 can be used in or implemented as a generator, a flywheel (e.g., flywheel 102), a flywheel section (104), and/or another type of electric machine or power system (e.g., system 100). It is noted that some of the components of the device 200 (e.g., supports 234, 238, magnets, etc.) are omitted from the illustration of FIGS. 2A and/or 2B for convenience in description.

The device 200 includes a plurality of stator disks 210, 212, 214, 216, 218 disposed about axis 202 (e.g., axis of rotation, rotor axis, symmetry axis, center axis, etc.). Each stator disk 210-218 includes disk attachment points or holes (exemplified by attachment points 230, 232) which are used to attach support members or disk attachment brackets (exemplified by support 234) configured to hold or support the stator disks 210-218 in the arrangement shown. For example, the support 234 may be connected to stator disk 210 at attachment point 230 and to stator disk 212 at attachment point 232.

The device 200 may also include a plurality of rotor disks 220, 222, 224, 226, 228 disposed about a common axis (e.g., rotational or symmetry axis 202). In an example, the plurality of rotor disks 220-228 are actuated simultaneously (e.g., by motor 114 of system 100) to rotate about axis 202 simultaneously as a multi-layer rotor. To facilitate this, in an example, the rotor disks are mounted relative to one another using one or more supports or disk attachment brackets between neighboring rotor disks (disposed along rotational axis 202 and in the central region of the device 200). For example, support 238 attaches rotor disk 228 (e.g., by fastening a bolt into the support and the rotor disk via attachment point 236) with rotor disk 226, and so on.

In one embodiment, the rotor disks 220-228 includes grooves, exemplified by grooves or indents 240, 242, 244, 246, 248, portions of which may extend to the peripheries of the rotor disks 220-228 as shown in the side view of FIG. 2B. The grooves 240-248, etc., represent positions at which magnets (not shown) are disposed in the rotor disks 220-228. In an example, a magnet (not shown) disposed in the rotor disk 228 at the position of groove 248 is axially aligned to have a magnetic north pole facing upwards to face a proximal side of the stator disk 218. In an example, a side of the rotor disk 228 facing the stator disk 218 is separated from the proximal side 218a of the neighboring stator disk 218 by a magnetic gap (also referred to as a magnetic gap threshold distance or similar) of 0.50 inches, 0.25 to 0.50 inches, 0.10 to 0.25 inches, 0.05 to 0.10 inches, etc.

Figure 3A:
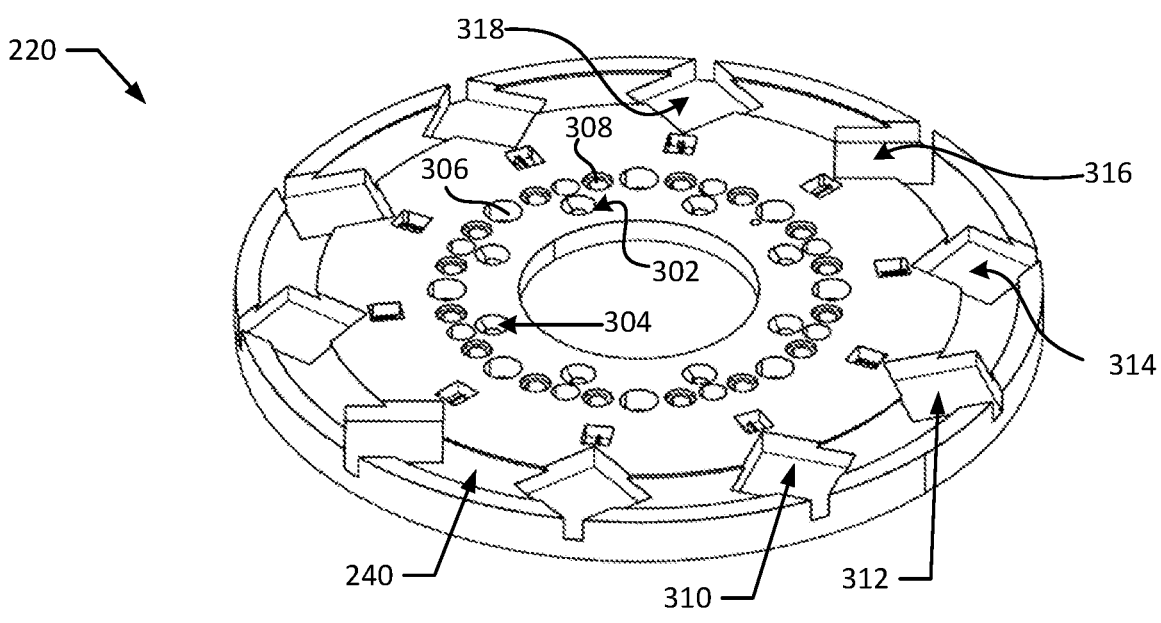
FIGS. 3A-3C illustrate an example rotor disk, according to an example embodiment.
Figure 3B:
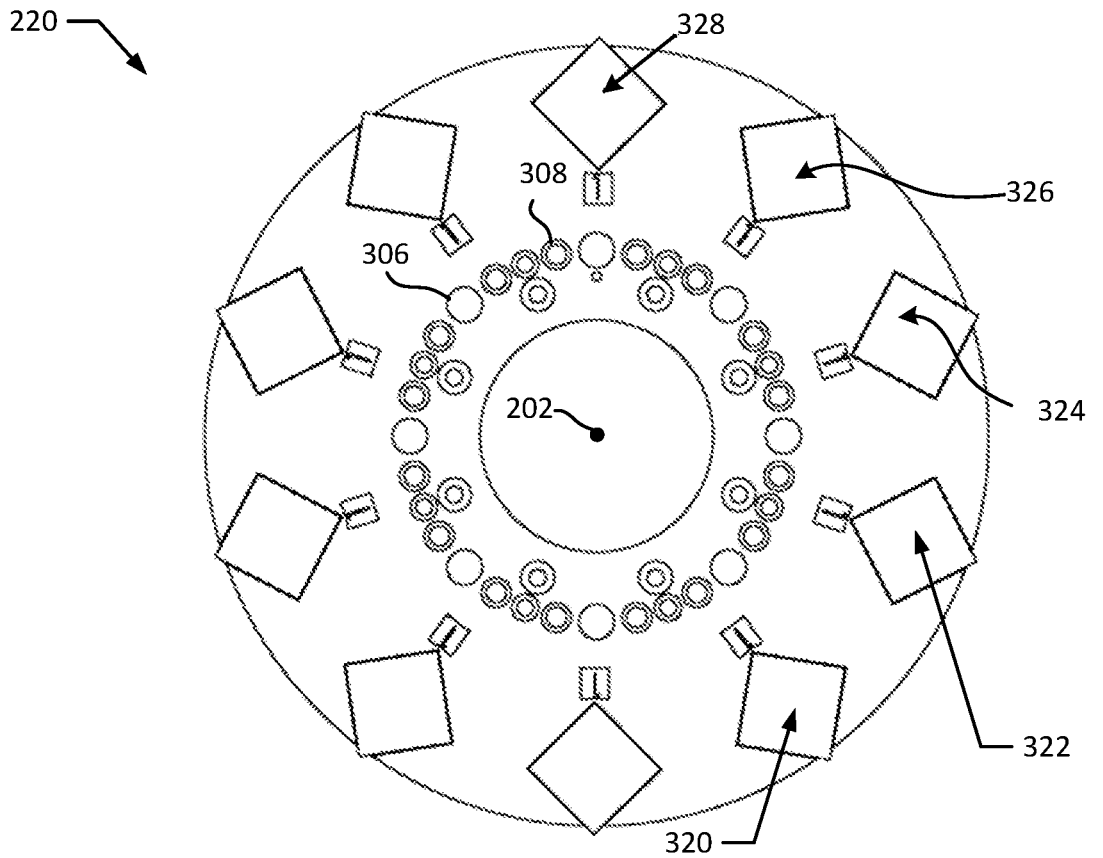

FIGS. 3A-3B illustrate an example implementation of the rotor disk 220, according to an example embodiment. It is noted that one or more components of the rotor disk 220 (e.g., magnets 320-328) are omitted from the illustration of FIG. 3A for convenience in description. FIG. 3A is a perspective view of the rotor disk 220 and FIG. 3B is a top side view. In particular, the top side view shown in FIG. 3B corresponds to the side of the rotor disk 220 that faces stator disk 210 in the arrangement of the device 200 shown in FIGS. 2A-2B.

FIG. 2C illustrates an isometric view of an example stator disk 250, according to embodiments of the present disclosure. The stator disk 250 has an outer circumference and projects several coil holders 260a-j (generally or collectively, coil holder 260) inward to a central opening (though which a drive shaft from the prime mover 114 connected to the various rotor disks may run). Each coil holder 260a-j holds an associated coil (not illustrated in FIG. 2C, see FIGS. 5A-7 for discussion of a coil in greater detail) in position relative to the other coils in a given level of the system 100, and relative to other coils in other levels of the system 100. For example, the first coil holder 260a holds an associated first coil in a first position, the second coil holder 260b holds an associated second coil in a second positon, etc. As illustrated, the coil holders 260 (and associated coils) are positioned to be evenly angularly distributed around the inner circumference of the stator disk 250 such that for N coils, each coil is located at an angular offset of 360/N degrees from its neighbors. Although illustrated in FIG. 2C with ten coil holders 260a-j, in various embodiments, more of fewer coil holders 260a-j and associated coils may be included in each stator disk 250.

The stator disks 250 are arranged in layers, which may include vertical stacks, horizontal rows, and other orientations based on the alignment of the system 100. The stator disks 250 may include various attachment hardware to connect to other stator disks 250 in the system 100 or to the casing of the system 100, which may be included in first edge 252a or a second edge 252b that are perpendicular to the outer circumference 254. These attachment hardware hold the stator disks 250 in place to keep the coil holders 260 generally in place within the level (e.g., to not rotate) while the prime mover 114 rotates the rotor disks, but may allow for movement of the coil in directions generally parallel to the rotational axis. For example, in a vertically oriented stack of stator disks 250, the coil may be allowed to move up/down or tilt downward/upward, but are not permitted to move left/right or counterclockwise/clockwise (e.g., closer/further latterly to the other coils in the same level.

In various embodiments, the layers of stator disks 250 are positioned so that each coil holder 260 is arranged to fully overlap the coil holders 260 on the stator disks 250 on the neighboring layers. In some embodiments, the layers of stator disks 250 are positioned so that each coil holder 260 is arrange with an angular offset relative to partially overlap or not overlap with the coil holders 260 on the stator disks 250 on the neighboring layers. For example, if a first stator disk 250 is positioned to have a first coil holder 260a of ten coil holders 260a-j located at a rotational offset of zero degrees, the second coil holder 260b would be located at a rotational offset of 36 degrees, the third coil holder 260c at a rotational offset of 72 degrees, etc. In a fully overlapping embodiment, the first coil holder 260a for a second stator disk 250 (neighboring the first stator disk 250 and a third stator disk 250) and a third stator disk 250 (neighboring the second stator disk 250) would have an angular offset of zero degrees, the second coil holder 260b of 36 degrees, the third coil holder 260c of 72 degrees, etc. In a sequentially overlapping example (which may include partial or no overlapping between levels) with an angular offset of four degrees applied between subsequent levels, in the second stator disk 250 the first coil holder 260a would be located at a rotational offset of four degrees, the second coil holder 260b would be located at a rotational offset of 40 degrees, the third coil holder 260c at a rotational offset of 76 degrees, etc., while in the third stator disk 250 the first coil holder 260a would be located at a rotational offset of eight degrees, the second coil holder 260b would be located at a rotational offset of 44 degrees, the third coil holder 260c at a rotational offset of 80 degrees, etc. Various angular offsets may be applied to achieve a sequentially overlapping arrangement, or the relative positions of the magnets in the rotor disks may be altered, as is discussed in greater detail in regard to FIGS. 9A-9F.

As shown in FIGS. 3A-3B, the rotor disk 220 includes a plurality of shaft attachment points, exemplified by holes or attachment points 302, 304, which can be used to couple (e.g., via bolts, etc.) the rotor disk 220 to a motor or other prime mover (e.g., motor 114) that actuates the rotor disks 220-228. The rotor disk 220 also includes one or more disk bracket attachment points, exemplified by attachment points 306, 308, which are configured to attach (e.g., via bolts, screws, etc.) the rotor disk 220 to a neighboring rotor disk (e.g., rotor disk 222) via a disk attachment bracket or support member, which may be similar to support 238 (shown in FIG. 2B) that attaches rotor disk 228 to rotor disk 226 via disk attachment point 236 (shown in FIG. 2A).

The rotor disk 220 also includes a plurality of magnet mounting grooves or indents, exemplified by indents 310, 312, 314, 316, 318. In one embodiment, the magnet mounting grooves or indents 310, 312, 314, 316, 318, etc., are angularly distributed around the rotational axis 202. The rotor disk 220 may also include a plurality of magnets, exemplified by magnets 320, 322, 324, 326, 328, disposed in (or mounted at) the plurality of indents 310, 312, 314, 316, 318, etc. For example, as shown, magnets 320, 322, 324, 326, 328 may be mounted (or disposed) in, respectively, indents 310, 312, 314, 316, and 318.

In an example, each indent is shaped to receive a magnet at a respective angular and radial position of the indent. For example, as shown, the plurality of magnets (e.g., magnets 320-328, etc.) disposed in the rotor disk 220 may be square magnets shaped to fit in the respective grooves or indents (e.g., indents 310-328) of the rotor disk. For instance, a shape of a surface of a magnet 320 (e.g., the surface facing the stator disk 210) may have a square shape. In alternate examples, one or more of the indents (e.g., indents 310-318, etc.) and/or the magnets (e.g., magnets 320-328, etc.) disposed on a rotor disk (e.g., any of rotor disks 220-228) may have a round shape, a rectangular shape, or any other shape.

In some examples, the indents (e.g., 310-318) of the rotor disk 220 and/or the magnets (e.g., 320-328, etc.) disposed therein are angularly distributed about the rotational axis 202 according to a particular distribution pattern. For instance, the particular distribution pattern may correspond to a specific combination of angular and radial positions of the magnets (e.g., 320-328) about the axis 202. In an example, neighboring magnets may be angularly separated by a same angular separation (e.g., 36 degrees etc.). As an example, if a reference angular position of magnet 320 about axis 202 were selected to correspond to an angular position of zero degrees about axis 202, then magnet 322 may be disposed at an angle of 36 degrees, magnet 324 may be disposed at an angle of 72 degrees, and so on. In another examples, neighboring magnets of the magnets 320-328, etc. may not necessarily be separated by a same angular separation offset, but may have different angular separation offsets to each neighbor. Accordingly, the plurality of magnets may be angularly distributed around the rotational axis 202 to be disposed at different angles from a starting radius (e.g., noted as 0 degrees) to be X degrees on an arc from a neighboring magnet. In the illustrated example, magnet 324 may be considered to be a neighboring magnet to magnet 326 and magnet 322, but not to magnet 328 or magnet 320 when evaluated in an angularly distributed sequence around the rotational axis 202.

In the example shown, the magnets 320-328, etc. are disposed at a same radial distance to the rotational axis 202. In another example, one or more magnets may be arranged to have different radial positions (i.e., distances from the axis 202) than one or more other magnets.

It is noted that one or more features of the rotor disks 222-228 (shown in FIGS. 2A-2B) may be similar to corresponding features of the rotor disk 220. For example, one or more of rotor disks 222-228 may include disk attachment points, magnet distribution patterns, etc., similar to those of rotor disk 220.

Alternatively or additionally, in some examples, one or more features of the rotor disks 222, 224, 226, and/or 228 may be different from rotor disk 220. For example, as best shown in FIG. 2A, rotor disk 228 may not include motor shaft attachment points (whereas rotor disk 220 includes motor attachment points 302-304). As another example, angular positions of magnet mounts and/or magnets (e.g., 320-328) in a given rotor disk may be offset from corresponding angular positions of indents (e.g., 310-318, etc.) and/or magnets (e.g., 320-328, etc.) of the rotor disk 220. For instance, as shown in FIG. 2B, magnets disposed in indents 240-248 may be offset or (purposely or due to manufacturing tolerances) misaligned relative to one another about the axis 202. For the sake of example, consider a scenario where an angular position of indent 240 (and the magnet disposed therein) about axis 202 corresponds to a reference angular position of 0 degrees. In this scenario, each rotor disk of the device 200 is mounted at a staggered angular offset of 5 degrees from the rotor disk below it. Thus, in this scenario, angular positions of indents 242, 246, 248 (and thus the magnets disposed therein) may correspond to, respectively, 5 degrees, 10 degrees, and 15 degrees.

Figure 3C:
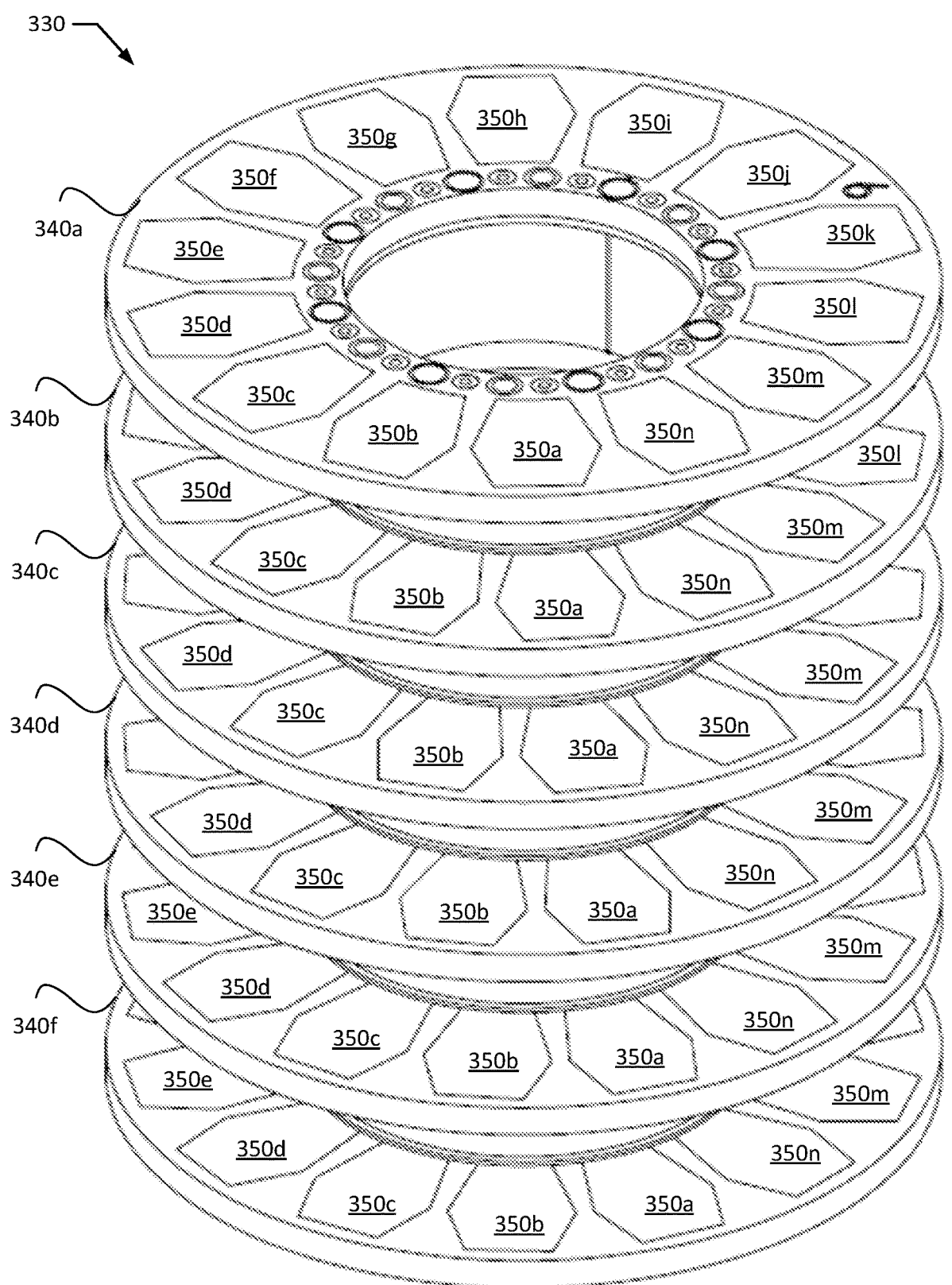

FIG. 3C illustrates an embodiment of a stack 330 of six rotor disks 340*a-f* (generally or collectively, rotor disk 340) with an angular offset applied between the magnets (not illustrated) included in neighboring rotor disks 340 in the stack 330. In some embodiments, the magnets are held in place via various cavities or indents (e.g., 310, 312, 314, 316, 318 per FIGS. 3A and 3B) formed in the body of the rotor disks 340 that are shaped according to the shape of the magnets. In some embodiments, in addition or alternatively to the use of magnet-shaped indents, the magnets may be held in place by various adapters 350*a-n* (generally or collectively, adapter 350). In various embodiments, the adapters 350 may include covers that are secured over an opening to the indent to secure a magnet therein as well as resin encapsulation of a magnet to provide an alternative size/shape for insertion into an indent. In various embodiments, the magnet and or adapter 350 may be secured to the indent via an adhesive (e.g., epoxy), solder, brazing, weld, friction, interlocking tabs, or the like.

In the stack 330, each rotor disk 340 positions the associated magnets to have an angular distribution relative to the axis of rotation. When evenly distributed, each magnet is located 360/N degrees from each of its neighboring magnets, where N is the number of magnets included in the given rotor disk 340. In the illustrated example in FIG. 3C with fourteen magnets (secured by a corresponding fourteen adapters 350*a-n*), each magnet is located approximately 25.7 degrees from its neighbors.

Additionally, the illustrated stack 330 shows an applied angular offset for corresponding adapters 350 (and associated magnets) between neighboring rotors disks 340 in the stack 330 to position the magnets (relative to the coils) to be sequentially offset during operation. The sequential offset is applied so that as the order in the stack increases (or decreases), the next member of the stack 330 applies an angular offset equal to a position in the stack minus one. For example, using the illustrated stack 330 of six rotor disks 340 having an angular distribution of approximately 25.7 degrees between neighboring magnets (and associated adapters 350) and an angular offset of approximately 5.14 degrees applied to neighboring rotor disks 340 in the stack 330, the first rotor disk 340*a* applies an angular offset of 0 degrees, (e.g., [1–1]*5.14 degrees), the second rotor disk 340*b* applies an angular offset of 5.14 degrees, (e.g., [2–1] *5.14 degrees), the third rotor disk 340*c* applies an angular offset of 10.28 degrees, (e.g., [3–1]*5.14 degrees), etc., until the sixth rotor disk 340*f* applies an angular offset of 25.7 degrees (e.g., [6–1]*5.14 degrees); thereby aligning the second adapter 350*b* of the sixth rotor disk 340*f* to fully overlap the first adapter 350*a* of the first rotor disk 340*a* (and the third adapter 350*c* of the sixth rotor disk 340*f* to fully overlap the second adapter 350*b* of the first rotor disk 340*a*, etc.) and restarting the pattern.

In various embodiments, the number of rotor disks included in the system may vary, as may the number of stators. In some embodiments, the number of stators may equal the number of rotor disks, be one more than the number of rotor disks, or be one less than the number of rotor disks. Additionally, the number of coils held by the stators may vary in different embodiments, as may the number of magnets, and the relative number of coils to magnets may be equal, have more magnets, or more coils in various embodiments. For example, in addition to the numbers and associated offsets shown in the illustrated Figures, a system 100 may include 2 to 10 stator disks in each stack, which may include angular offsets between stators or rotors of 0 to 15 degrees, with a spacing of 0.01 inches to 2 inches between neighboring stators/rotors.

Figures 4A, 4B, 4C:
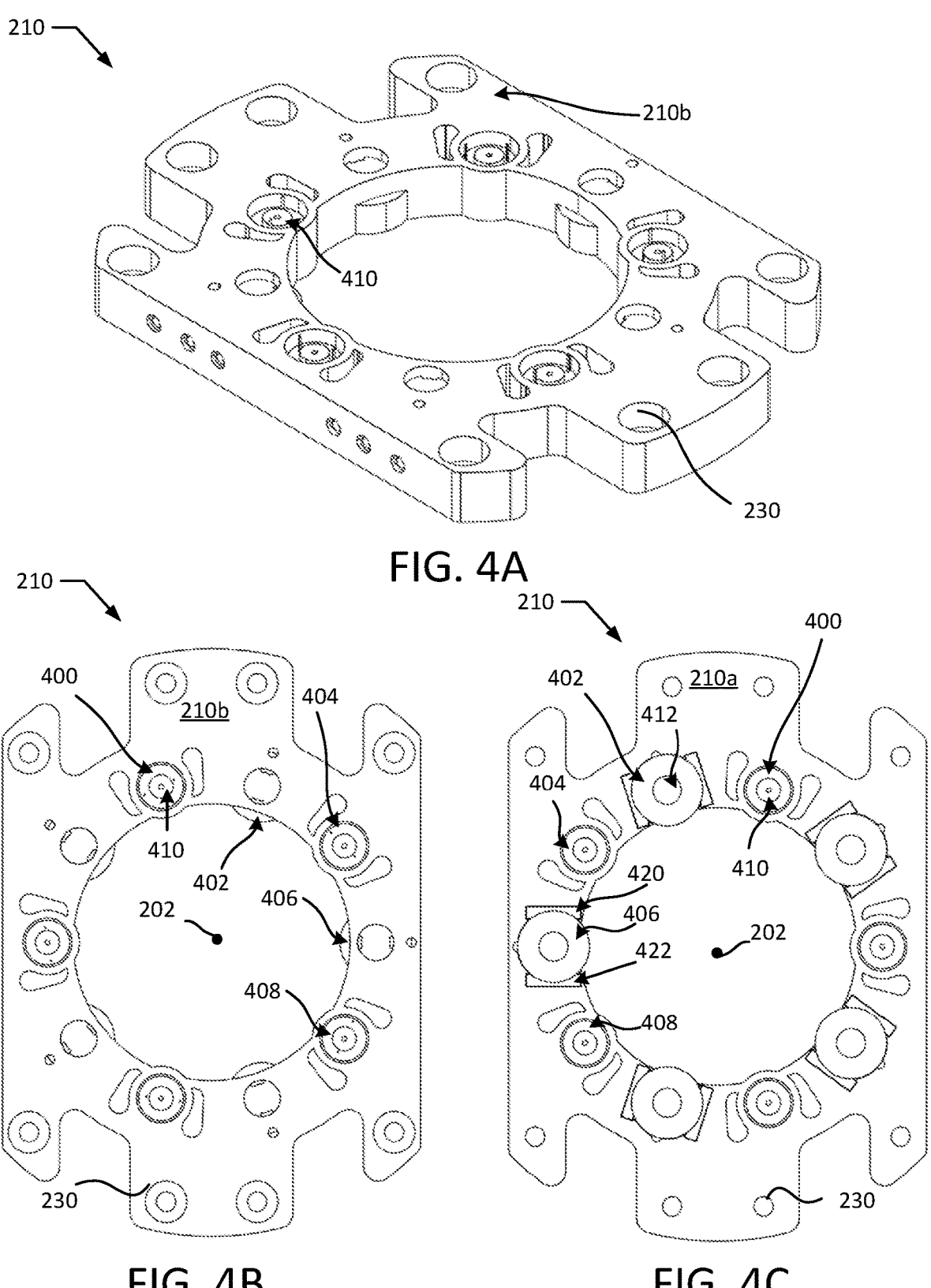
FIGS. 4A-4C illustrate an example stator in a disk configuration, according to an example embodiment.

FIGS. 4A-4C depict, respectively, perspective, top, and bottom views of an example embodiment of a stator disk (e.g., the stator disk 210), according to an exemplary embodiment of the present disclosure. For example, the top view of FIG. 4B shows the distal side 210*b* of the stator disk 210 along the surface of the page, and the bottom view of the stator disk 210 shows the proximal side 210*a* of the stator disk 210 along the surface of the page. For convenience in description, the axis 202 (extending through the page) is shown as a solid point in the center of FIGS. 4B-4C.

The stator disk 210 may include one or more coils of wire, exemplified by coils 400-408, which are mounted in and/or supported by the stator disk 210 in a particular arrangement around the axis 202. In examples, one or more of the coils (e.g., 400-408) mounted at the stator disk 210 may be arranged to sequentially overlap a plurality of magnets of a rotor disk (e.g., the magnets 320-328 of the rotor disk 220) in response to rotation of the rotor disk about the axis 202. For example, the coils 400-408 may be positioned at a same or similar radial distance to the axis 202 as the magnets 320-328 (shown in FIG. 3B) of the rotor disk 220.

In examples, the coils mounted in the stator disk 210 may be arranged to extend axially away from the rotor disk (e.g., 220). For example, the coils 400-408 may be wound about respective coil axes (e.g., each coil axis may extend through a center of a respective coil in a direction perpendicular to the page in the illustration of FIGS. 4B-4C). Thus, the coils 400-408, etc., of the stator disk 210 may each have proximal end (shown in FIG. 4C) facing the rotor disk and a distal end opposite the proximal end. For instance, an end of the coil 400 shown in FIG. 4B is the distal end of the coil 400, and another end of the coil 400 shown in FIG. 4C is the proximal end of the coil 400.

Additionally, the stator disk 210 may mount the coils (e.g., 400-408, etc.) such that respective proximal ends of the coils (shown in FIG. 4C) facing a rotor disk (e.g., the rotor disk 220) are positioned at a given distance (e.g., magnetic gap) and/or are within a threshold distance (e.g., magnetic gap threshold) to the rotor disk.

In some examples, the stator disk 210 is configured to define a variable magnetic gap between the coils (e.g., 400-408) and the rotor disk (e.g., 220). For example, the stator disk 210 may be formed from a material (e.g., plastic, etc.) capable of flexibly bending, or may flexibly attach the coils, or may be flexibly attached itself (e.g., to a frame of the system 100, etc.) to allow distance variations between the coils and the rotor disk. More generally, for example, the stator disk 210 may be configured to flexibly mount the coils (e.g., 400-408) to enable the coils to move (e.g., due to vibrations in the device 200 or the system 100, and/or due to magnetic interactions between the coils and magnets of one or more rotor disks, etc.) during rotation of the rotor disk about the axis 202.

The stator disk 210 may also include one or more magnetic cores (e.g., ferromagnetic cores, etc.) disposed in one or more respective coils of the 400-408, etc. For instance, in the illustrated example, the stator disk 210 may include a magnetic core 410 disposed in the coil 400, a magnetic core 412 disposed in the coil 402, and so on.

The stator disk 210 may also include one or more walls disposed adjacent to a coil. For example, as shown, the walls 420 and 422 are disposed adjacent to the coil 406. The walls 420-422, etc. may be formed from a magnetic material, such as a ferromagnetic material or other magnetic material (e.g., material having a magnetic permeability greater than one). In some examples, a magnetic core in the coil 406 may be made from a same material (and/or have a same magnetic permeability) as the walls 420-422. In other examples, the core and the walls are formed from different materials (and/or have different magnetic permeability values). In an example, the walls 420-422 are disposed in contact with the coil 406. In alternate examples, one or more of the walls 420-422 may be separated from the coil 406 by a given distance (e.g., a small separation distance, etc.).

In some examples, one or more coils in the stator disk 210 may differ from one or more other coils. For example, the coils 400 and 402 may have different numbers of turns, different coil materials, different coil lengths, different coil sizes, different wire thicknesses, different core sizes, and/or different core materials, among other coil characteristics.

Figure 5A:
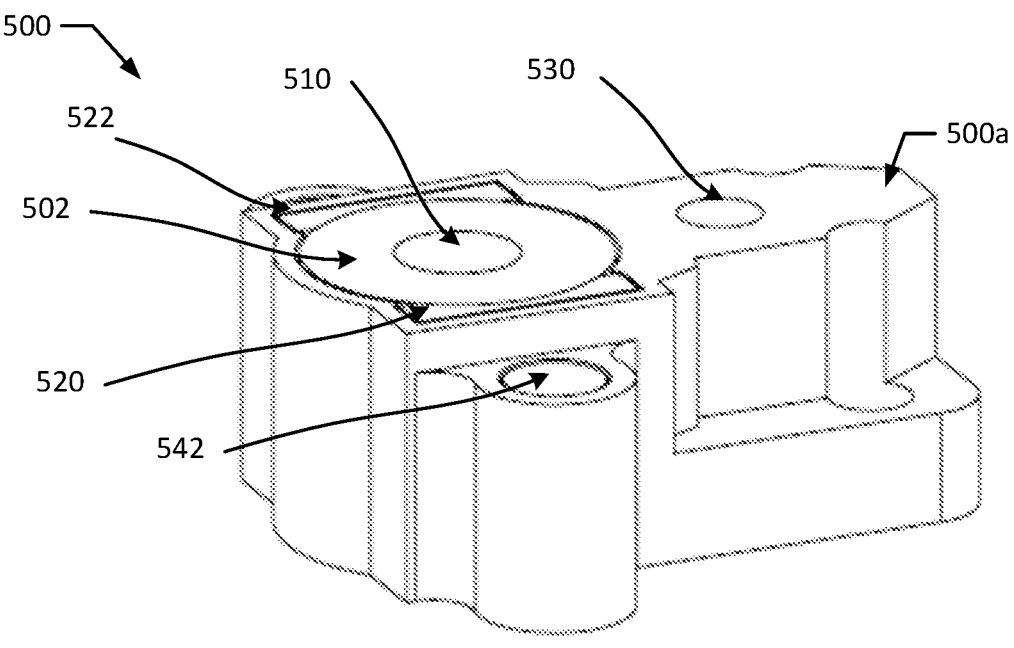
FIGS. 5A-5C illustrate additional stators configured for supporting one or more coils near the magnets of the rotor disks, according to an example embodiment.
Figure 5B:
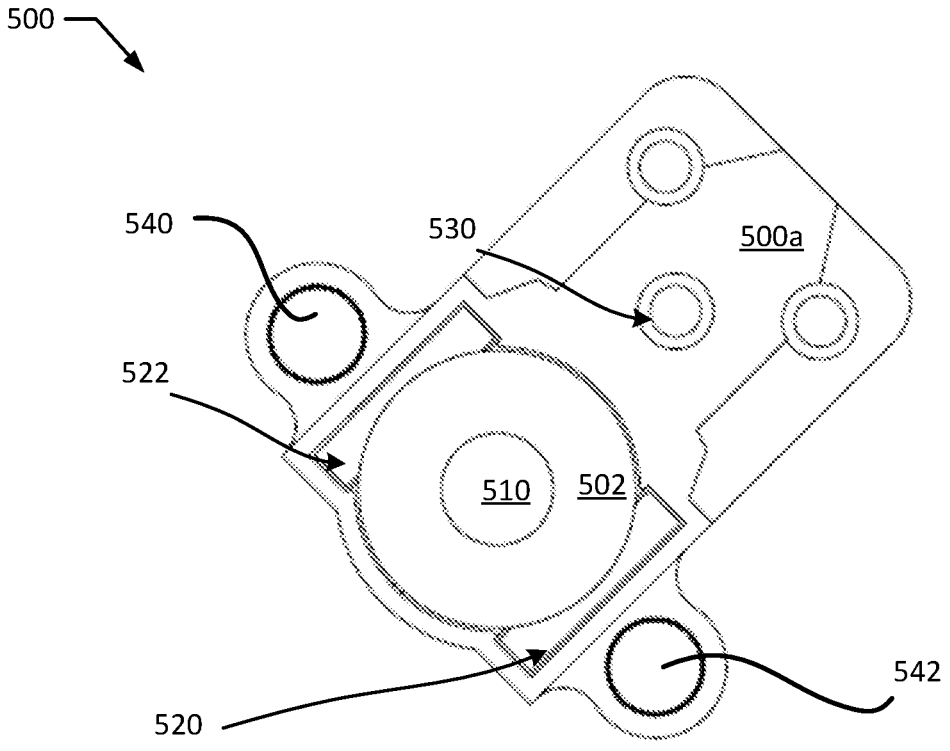
Figure 5C:
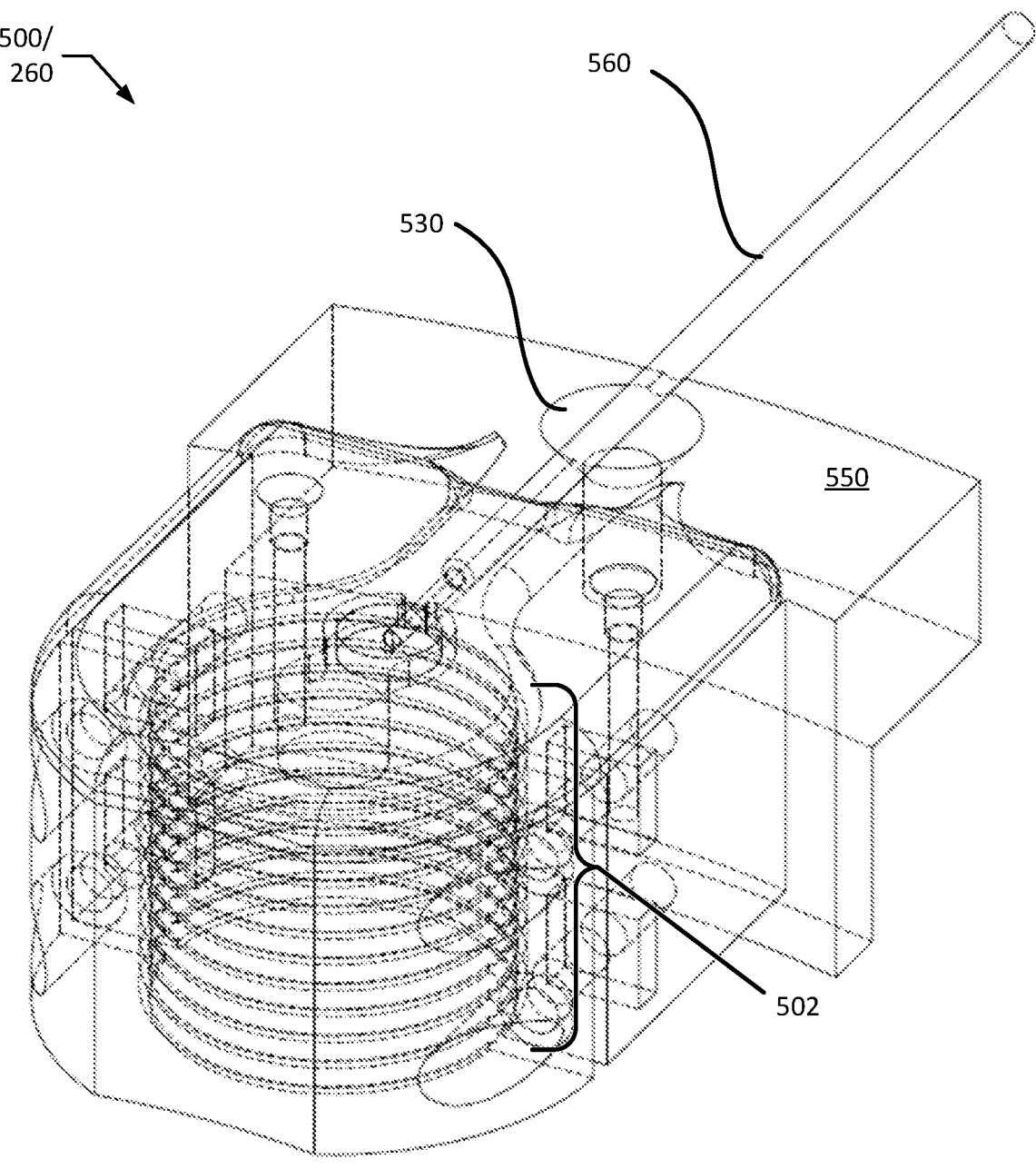

FIGS. 5A-5C illustrate example stators 500, according to an example embodiment. FIG. 5A is a perspective side view of the stator 500, FIG. 5B is a bottom side view of the stator 500, and FIG. 5C is a transparent view of a stator 500. In some examples, the stator 500 (or one or more components thereof) may be used instead of or in addition to one or more components of a stator disk, such as any of the stator disks 210-218. The stator 500 has a proximal side 500a, which may be disposed adjacent to a rotor disk (e.g., rotor disks 220-228) similarly to the proximal side 210a of the stator disk 210. In this regard, the top side view of the stator 500 shown in FIG. 5B may be similar to the bottom side view of the stator disk 210 shown in FIG. 4B. Particularly, FIG. 5B depicts a view of the proximal side 500a of the stator 500. In the illustrated example, the stator 500 includes a coil 502, a magnetic core 510, and walls 520-522, which may be similar to, respectively, any of the coils 400-408, any of the cores 410-412, and the walls 420-422 of the stator disk 210. The stator 500 may also include one or more attachment points, exemplified by attachment point 530, which may be used to mount or otherwise position the stator 500 at a given distance (e.g., within a magnetic gap) from a rotor disk (e.g., rotor disks 220-228), similarly to the attachment point 430 described for the stator disk 210 for example.

The stator 500 may also include two stator magnets 540, 542 (e.g., permanent magnets) disposed neighboring (and/or adjacent to) the walls 520, 522 (as well as the coil 502 and the core 510). In an example, the stator magnets 540, 542 may be magnetized such that a polarity of the stator magnets 540, 542 proximal to and facing a rotor disk (e.g., the rotor disk coupled to the stator 500) is the same as respective polarities of magnets at the side of the rotor disk facing the stator 500. Referring back to FIG. 3B for example, if the stator 500 is used with the rotor disk 220 (e.g., instead of or in addition to the stator disk 210) and the sides of the magnets 320-328 shown in FIG. 3B correspond to the magnetic north poles of the magnets 320-328, then the proximal ends of the magnets 540-542 shown in FIG. 5B would also have magnetic north poles facing the magnetic north poles of the rotor disk 220. With this arrangement, for example, magnetic flux density of the magnetic flux received in the coil 502 (and/or the core 510) from the rotor disk 220 as the rotor disk 220 rotates about the axis 202 can be optimized (or increased) due to magnetic interactions between the stator magnets 540-542 of the stator 500 (next to the coil 502) and the magnets 320-328 on the rotor disk.

FIG. 5C shows the components of a stator 500 in a transparent view, such as may be used with in one coil holder 260 disposed around the inner circumference of a stator disk 250 with one or more other coil holders 260 (e.g., as in FIG. 2C). An attachment interface 550 (that includes one or more attachment points 530 to connect the coil holder 260 to a stator disk 250 or other structural element) holds the coil 502 in place, and provides a wiring interface 560 to electrically connect the coil 502 with one or more other coils 502 (e.g., in the same or a different level of the system 100) and an electrical load (e.g., via one or more switches or busses). In various embodiments, the coil 502 may be wound around an air gap or may include a solid core that extends longitudinally within the coil 502 (either fully or partially along the length).

FIGS. 6A-6C illustrate perspective, top side, and front side views of another example stator 600, according to an example embodiment. In some examples, the stator 600 (or one or more components thereof) may be used instead of or in addition to one or more components of a stator disk, such as any of the stator disks 210-218. In the illustrated example, the stator 600 includes a plurality of coils 602, 604, 606, which may be similar to any of the coils 400-408, and/or 502. The coils 602-606 are arranged to extend axially away from a rotor disk (e.g., similar to the rotor disks 220-228). To that end, coils 602-606 may each have a proximal end facing the rotor disk and separated from the stator disk by a magnetic gap (e.g., 0.5 inches, 0.1 inches, etc.) defined by the stator 600. In some examples, the magnetic gap may be a variable magnetic gap. For example, the coils 602-606 may be flexibly mounted so that the coils can vibrate or move within a threshold range of distances (e.g., the variable magnetic gap) to the rotor disk while the rotor disk is spinning or rotating about an axis (e.g., axis 202). With this arrangement for example, power generation efficiency improvements can be achieved by allowing motion of the coils to further vary magnetic flux inside the coils during rotation of a rotor disk magnetically coupled to the coils.

Additionally, the stator 600 may include one or more coils (e.g., coils 602, 604, and 606) positioned on opposing sides of the rotor disks, and that display an alternating arrangement of which side of the rotor disk the coils face. As illustrated, coil 602 faces a first side of a rotor disk, coil 606 faces a second side of the rotor disk (opposite to the first side), and coil 604 faces the first side of the rotor disk. Each of coil 602 and 604 are positioned to face coil 606 (and vice versa). Thus, with this arrangement, the stator 600 can be used to generate an electric current induced by magnetic fields from both sides of the rotor disk.

Figure 7:
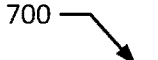
FIG. 7 illustrates an example rotor/stator assembly that includes coils arranged to overlap and face two sides of a stator disk, according to an example embodiment.
Figure 7:
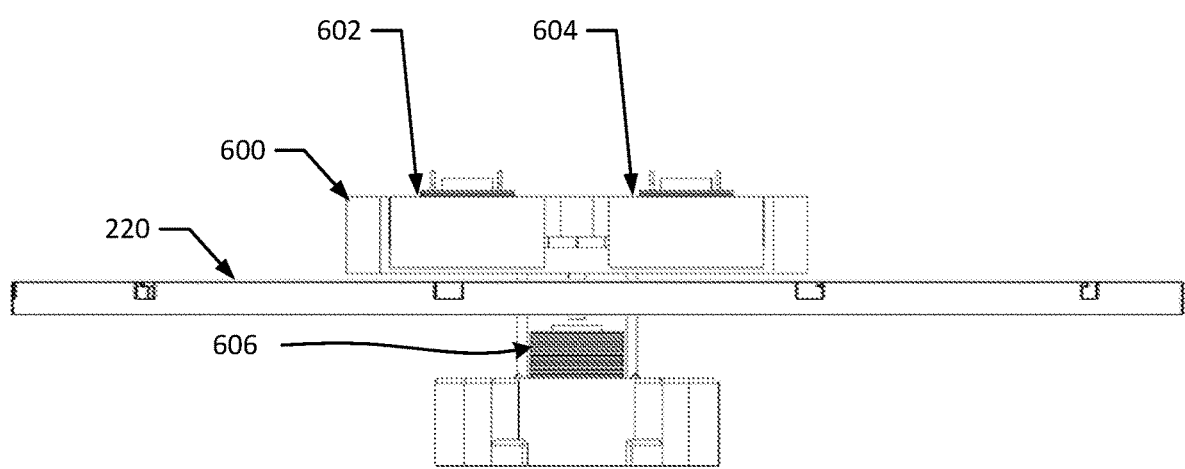

FIG. 7 illustrates an example rotor-stator assembly 700, according to an example embodiment. The assembly 700 may be similar to and/or may be used with the system 100, the device 200, an electric machine, a flywheel system, a generator, and/or any other type of power system for example. For the sake of example, the assembly 700 depicts an embodiment of a device (e.g., flywheel, generator, power system, etc.) that uses the stator 600 (e.g., instead of or in addition to the stator disk 210) to generate electricity based on magnetic fields of the arrangement of magnets (e.g. 320-328) rotated by the rotor disk 220.

In the example of FIG. 7, the stator 600 is arranged so that a top side of the rotor disk 220 (e.g., the side shown in FIG. 3B) faces one or more coils 602-604 of the stator 600 while a bottom (opposite) side of the rotor disk (faces one or more other coils (e.g., coil 606) of the stator 600.

In some examples, the magnets (e.g., 320-328, etc.) of the rotor disk 220 may be magnetically aligned in a same direction (e.g., north poles pointing in the same direction, or south poles pointing in the same direction). By way of example, referring back to FIG. 3B, magnetic poles of all the magnets 320-328, etc. may be aligned to point out of (and perpendicular to) the page. In this example, proximal ends of the coils 602-604 (i.e., the ends of the coils 602-604 that are facing the top side of the rotor disk in the illustration of FIG. 7) may sequentially face and overlap the north poles of the magnets as the rotor disk 220 rotates about axis 202. Whereas, in this example, a proximal end of the coil 606 (i.e., the end of coil 606 that is facing the bottom side of the rotor disk in the illustration of FIG. 7) may instead face south poles of the magnets (sequentially) during the rotation of the rotor disk 220.

Figure 8A:
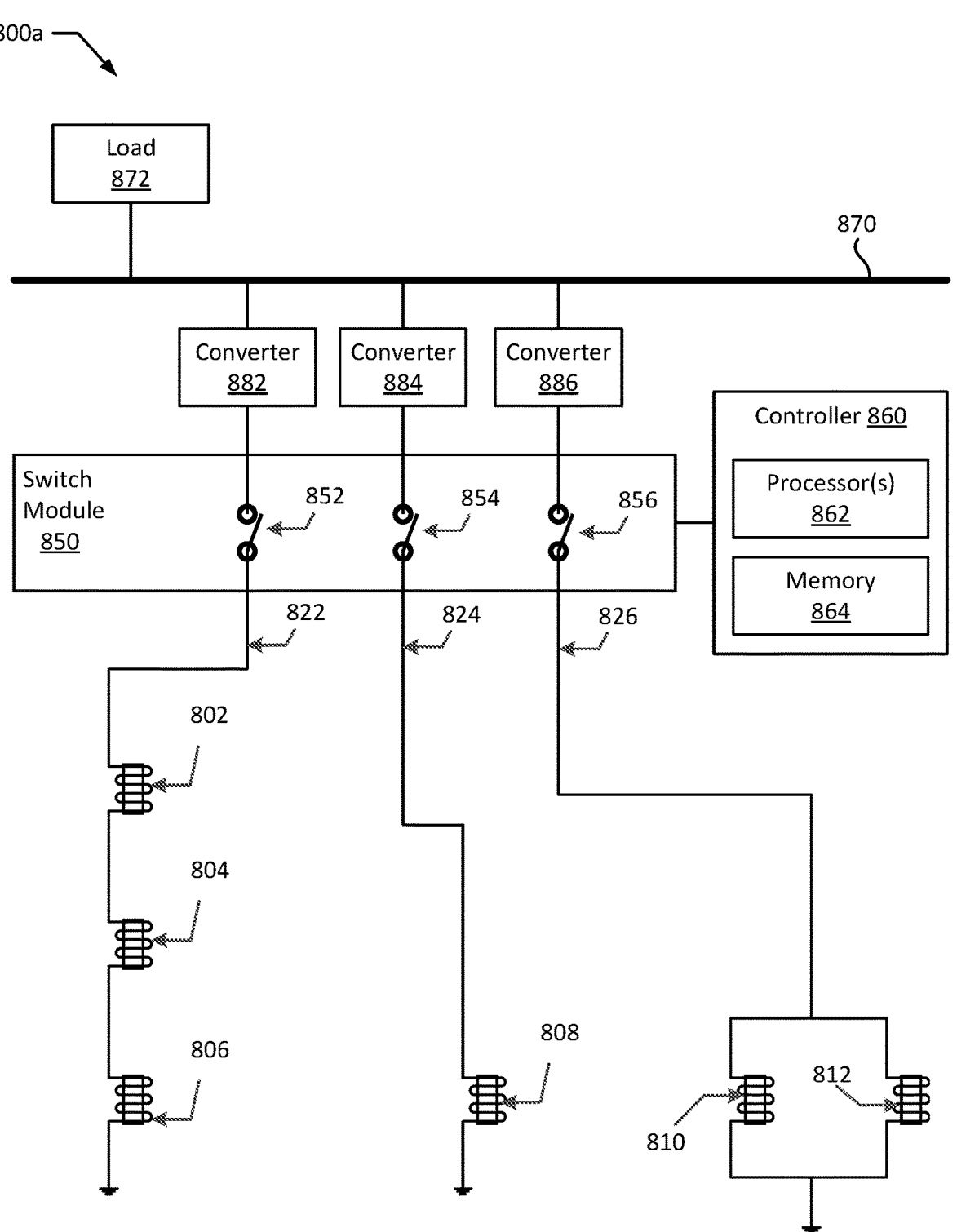
FIGS. 8A and 8B are a block diagrams of example systems for selectively connecting one or more generator coils of a multi-layer electric machine to a load bus, according to an example embodiment.
Figure 8B:
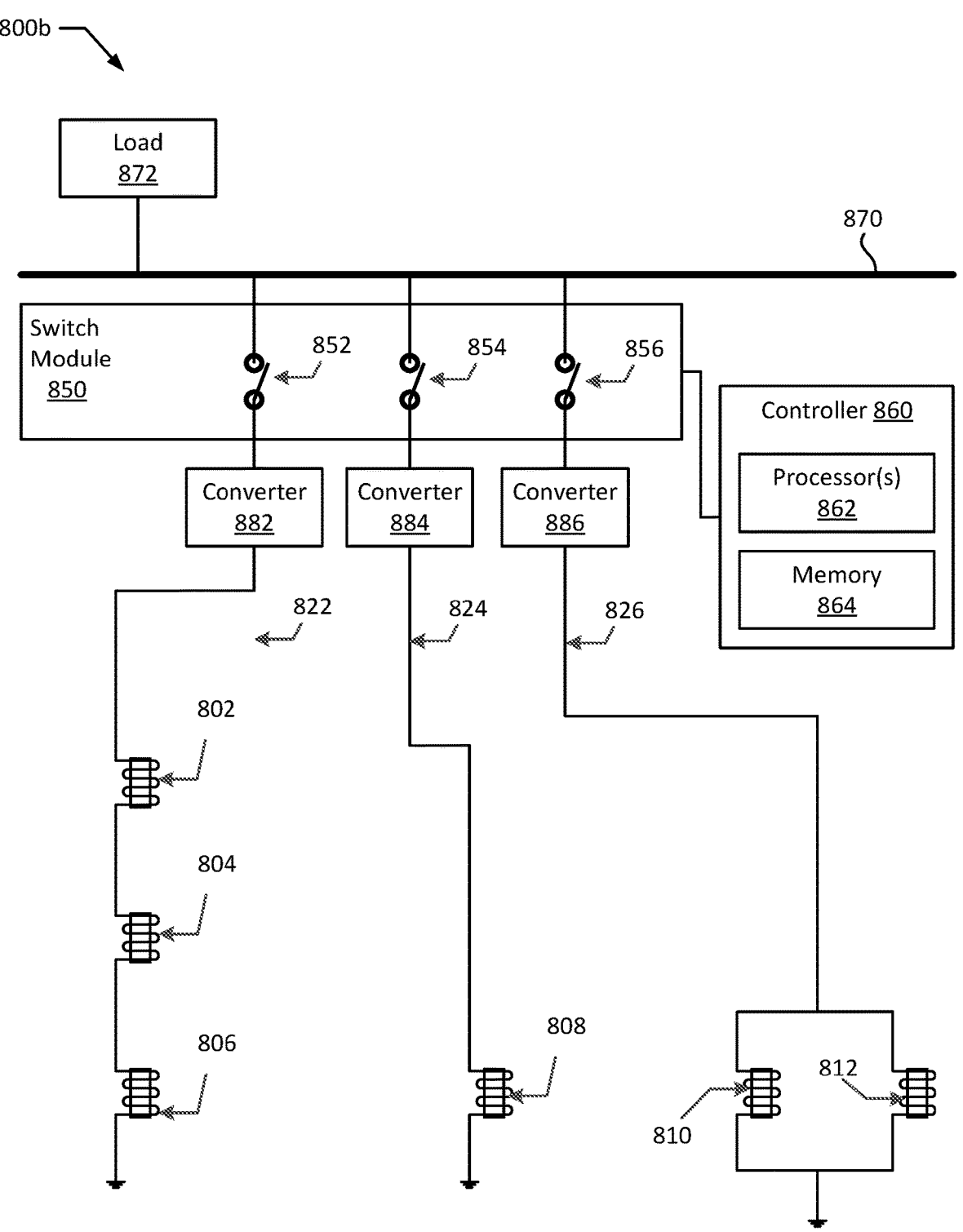

FIGS. 8A and 8B illustrate example systems 800a-b (generally or collectively, system 800) for selectively providing power, according to an example embodiment. As shown, the system 800 includes the coils 802-812, a switch module 850, a controller 860, a load bus 870, a load 872, and converters 882-886. It is noted that the system 800 may additionally or alternatively include more or fewer components than those shown. More generally, FIGS. 8A and 8B may represent a schematic illustration of a circuit or other electrical power system 800 for powering the load 872 by selectively connecting the load 872 to one or more coils of a flywheel (and/or other type of power generation system), such as the system 100, the device 200, and/or the rotor-stator assembly 700 for example. To that end, the coils 802-812 may be similar to (and/or may correspond to) any of the coils 402, 404, 406, 408, 502, 602, 604, and/or 606.

In some examples, the system 800 may include two or more coils (e.g., 802-806) that are electrically connected in series to provide a combined power output (e.g., power line 822). In an example, the coils 802-806 may be arranged similarly to the coils 602-606 of FIGS. 6A-6C, so that one or more of the coils 802-806 faces a first side of a rotor disk (e.g., similarly to coils 602-604) and one or more other coils of the coils 802-806 face a second (opposite) side of the same rotor disk (e.g., similarly to coil 606). In another example, all of the coils 802-806 may instead face a same side of a single rotor disk. In another example, the coils 802-806 may include a combination of coils facing two or more different rotor disks. Referring back to FIG. 2B for instance, the coils 802-806 may include coils from two or more of the stator disks 210-218 that are electrically connected in series to provide the combined power line 822. It is noted that FIGS. 8A and 8B show a single set of three coils (e.g., 802-806) connected in series only for the sake of example. In some examples, the system 800 may alternatively or additionally include fewer or more coils electrically connected in series, and/or may include more or fewer sets of coils that are electrically connected in series.

Additionally or alternatively, in some examples, the system 800 may include a single coil (e.g., coil 808) or a plurality of coils electrically wired to provide a power output (e.g., power line 824). Additionally or alternatively, in some examples, the system 800 may include two or more coils (e.g., 810-812) electrically connected in parallel to provide a combined power output (e.g., power line 826). Similarly to the coils 802-806, the coils 810-812 may include coils arranged in a variety of ways (e.g., facing a same side of one rotor disk, facing two sides of one rotor disk, facing different rotor disks, etc.), and may alternatively or additionally include more than two coils electrically connected in parallel. Other combinations and/or circuit topologies for electrically connected coils are possible.

The switch module 850 may include any type of electrical signal switching device (e.g., load contactor, relay, etc.) suitable for selectively connecting one or more of the power lines 822-826 to the load bus 870. In an example, the switch module 850 may include a plurality of switches 852, 854, 856 which are connected to, respectively, the power lines 822, 824, and 826 at their inputs. In this example, each of the switches 852-856 may be controlled separately to selectively connect the respective power line 822-826 received at its input with the load bus 870.

The controller 860 may include any combination of hardware and/or analog circuitry wired to perform the functions of the controller 860 described herein. Alternatively or additionally, the controller 860 may include one or more processors 862 and a memory 864. The processor 862 represents any processing unit capable of executing or performing the operations and procedures described herein, which can include central processing units (CPUs), graphical processing units (GPUs), a single processor, multiple processors, processors with multiple cores, programmable logic arrays (PLAs), field-programmable gate arrays (FP-GAs), Application Specific Integrated Circuits (ASICs), systems on a chip (SoC), microcontrollers, and the like. The memory 864 may include volatile, non-volatile, and/or any other type of memory device (e.g., RAM, ROM, disk storage, other data storage device) storing program instructions which, when executed by the processor(s) 862, cause the controller 860 to perform the functions and operations described herein.

Regardless of the implementation of the controller 860, in general, the controller 860 is configured to provide control signals for controlling the switch module 850. In particular, the controller 860 may be configured to select which of the power lines 822-826 should be connected to the load bus 870, and to generate control signals that cause the switch module 850 to connect or disconnect the power lines 822-826 from the load bus 870 accordingly.

In an example, the controller 860 is configured to select one or more of the power lines 822-826 (and/or the coils connected thereto) based on measurements of load level at the load bus. For example, if the load bus is connected to a load 872 associated with a certain amount of power and/or other power signal characteristics, the controller 860 may select one or more power lines 822-826 determined to be suitable for optimally and/or efficiently powering the load 872.

In an example, the controller 860 is configured to select one or more of the power lines 822-826 (and/or the coils connected thereto) based on expected characteristics of the load 872 connected to the load bus 870. For example, the controller 860 may employ a machine learning algorithm or other type of computation to predict the expected characteristics of the load 872 and then select an appropriate combination of one or more power lines 822-826 accordingly.

In an example, the controller 860 is configured to select one or more of the power lines 822-826 (and/or the coils connected thereto) based on predetermined characteristics of the coils 802-812. For instance, information about characteristics of the coils connected to each power line 822-826 (e.g., series/parallel connection, number of coil turns, power generation capacity, etc.) can be used by the controller 860 as a basis for deciding which one or more of the power lines

822-826 should be selected to optimally and/or efficiently power the loads (e.g., load 872) connected to the load bus 870.

In an example, the controller 860 is configured to select one or more of the power lines 822-826 (and/or the coils connected thereto) based on a time-of-day. For example, the controller 860 may determine that a peak power demand occurs periodically during a certain time of day (e.g., night time, day time, etc.), and vice versa. In turn, the controller 860 may control the switch module 850 to connect relatively higher power generator capacity (e.g., more of the power lines 852-856) to the load bus 870 during or prior to an anticipated peak power demand period. Alternatively or additionally, the controller 860 may control the switch module 850 to connect a relatively smaller power generator capacity (and/or disconnect excess capacity currently connected) to the load bus 870 during or in anticipation of lower power demand periods.

The load bus 870 may represent any type power transmission medium (e.g., a power line, power distribution network, etc.) suitable for transporting power generated by the system 800 to one or more loads (e.g., load 872) connected to the load bus 870.

Converters 882-886 may include any type of AC/DC converter configured to convert the AC current output of the coils 802-812 into a Direct Current (DC) current input into the load bus 870. In the illustrated example, each power line 822-826 is connected to a separate converter disposed between the power line and the load bus 870. For example, as shown, converter 882 converts the AC current output from power line 822 (e.g., combination of coils 802-806) into a DC current input into the load bus 870, and so on. In alternate examples, a different number of converters 882-886 and/or positions of the converts is possible as well. In an example, a single converter is disposed between the switch module 850 and the load bus 870 to convert any or all of the power lines 822, 824, and/or 826 are connected to the load bus 870 via the switch module 850 instead of or in addition to the converters 882-886.

Figure 9A:
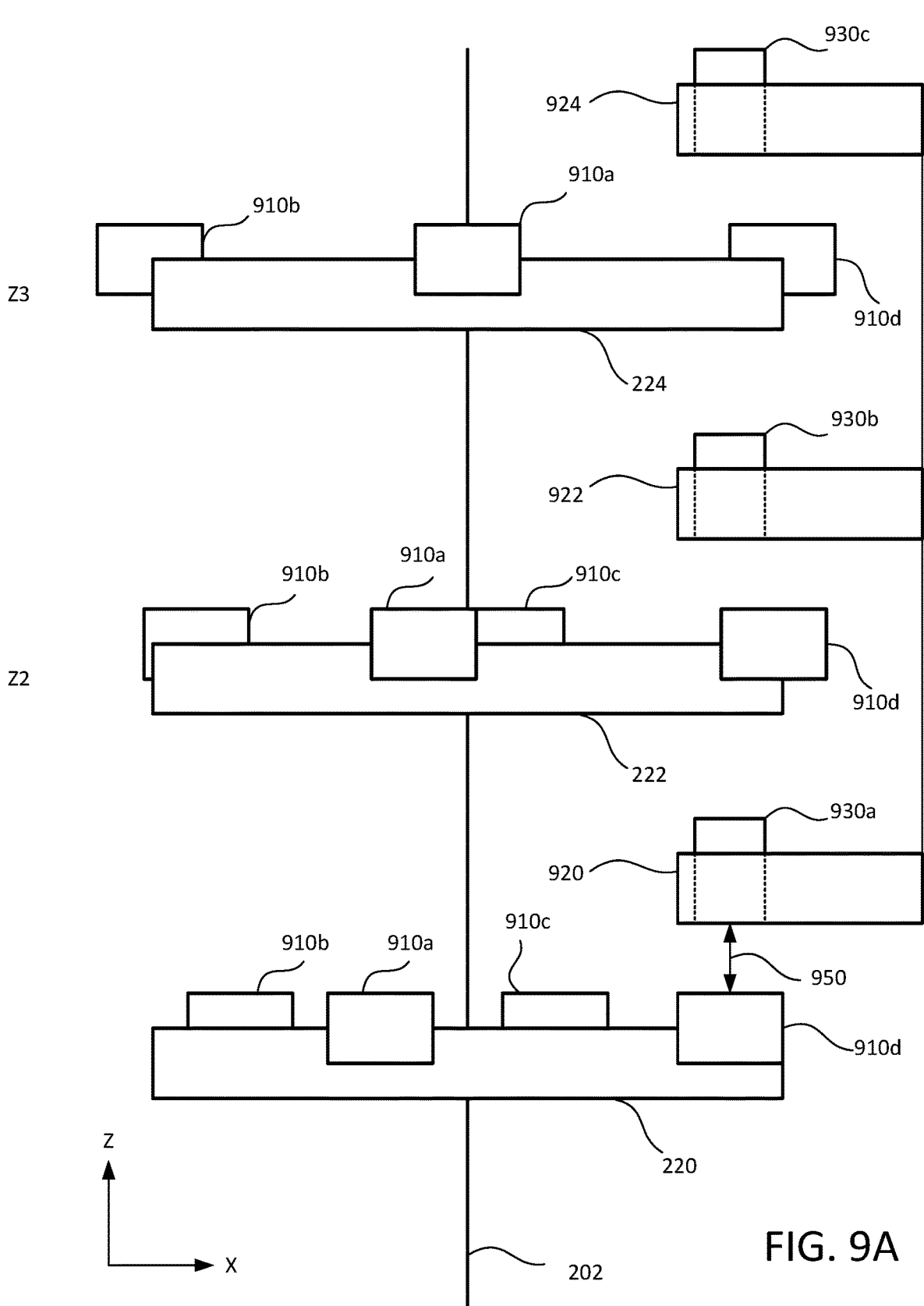
FIGS. 9A-9F provide conceptual diagrams for interactions between elements of the system described herein, according to an example embodiment.
Figure 9B:
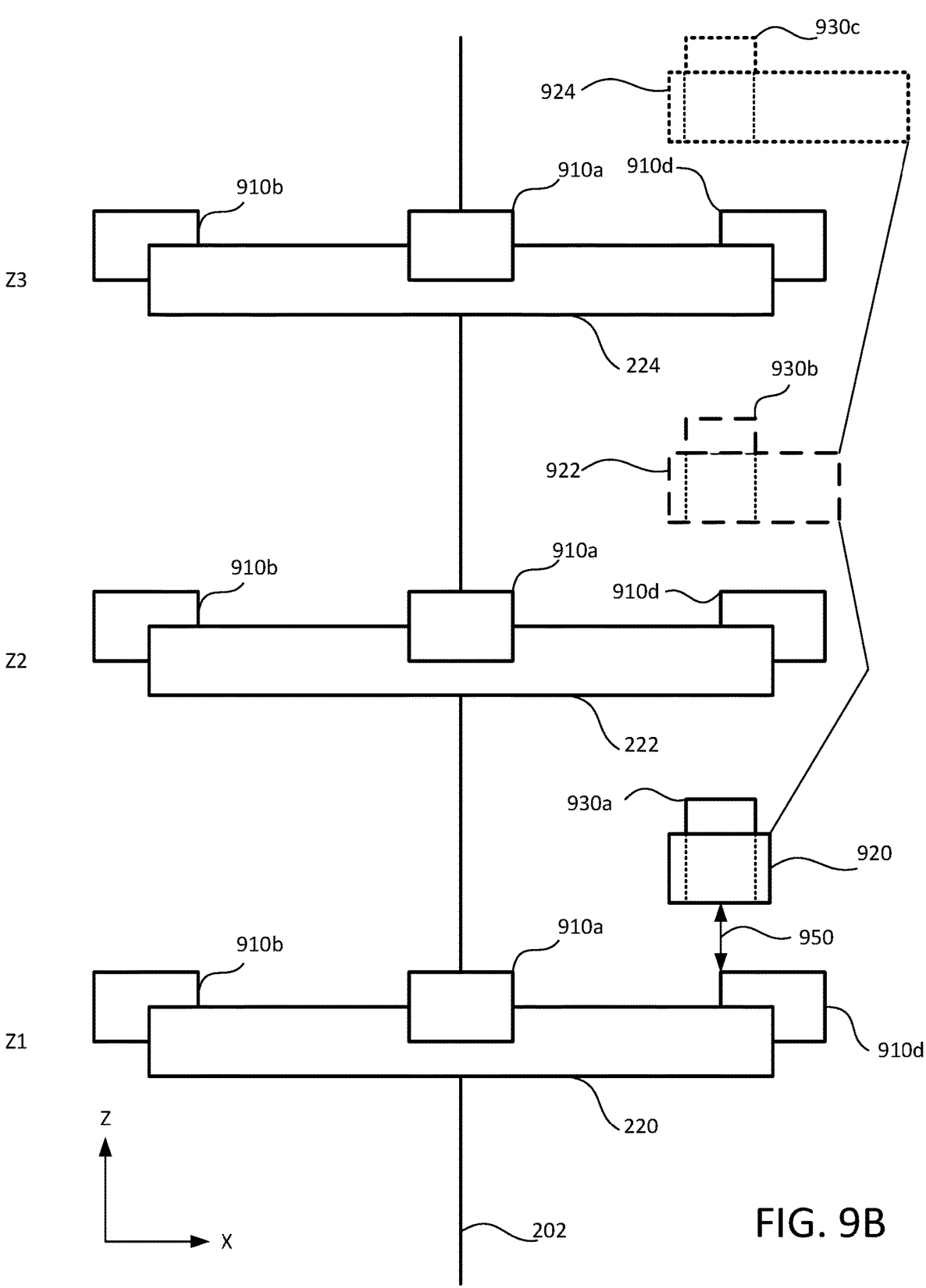
Figure 9C:
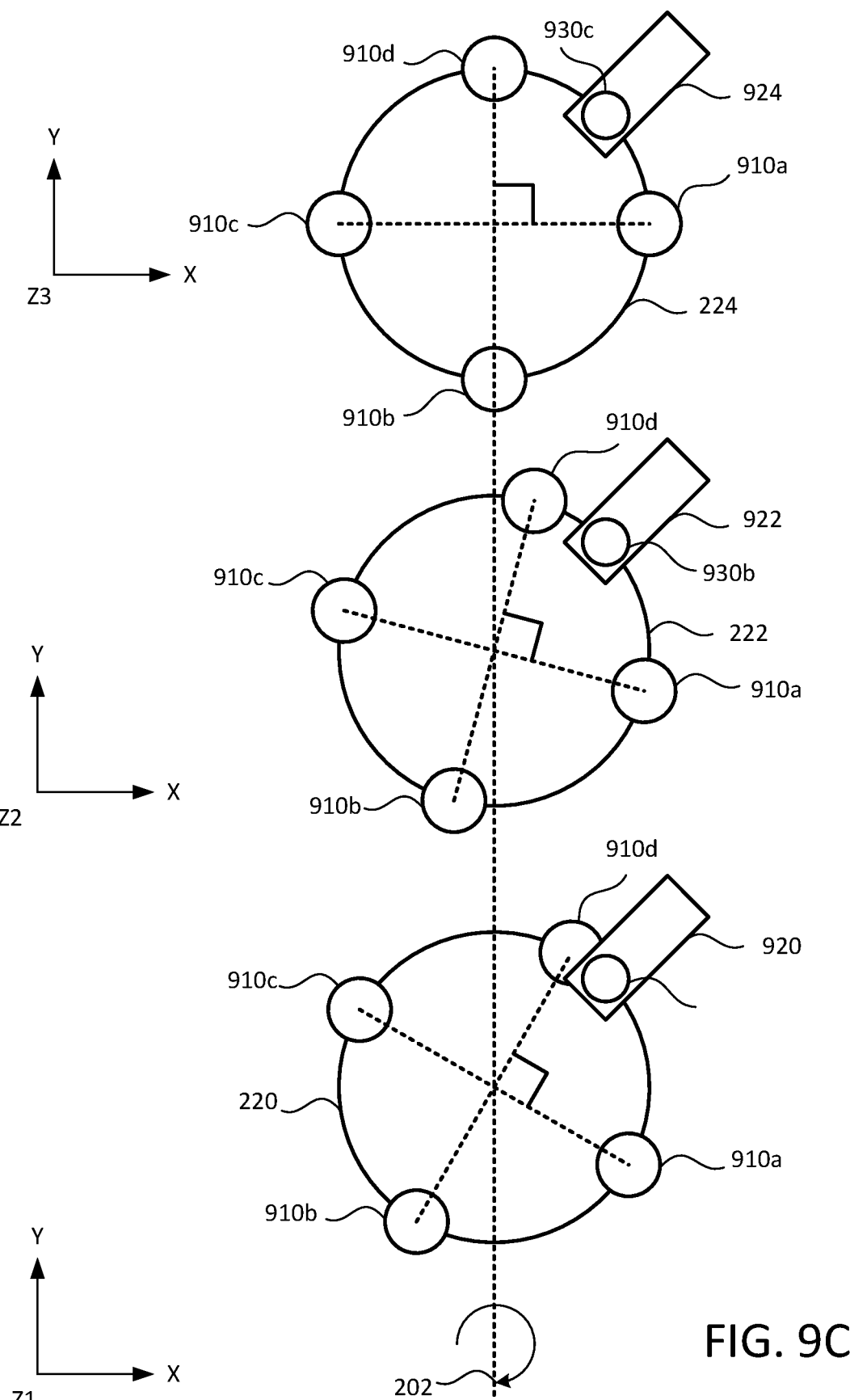
Figure 9D:
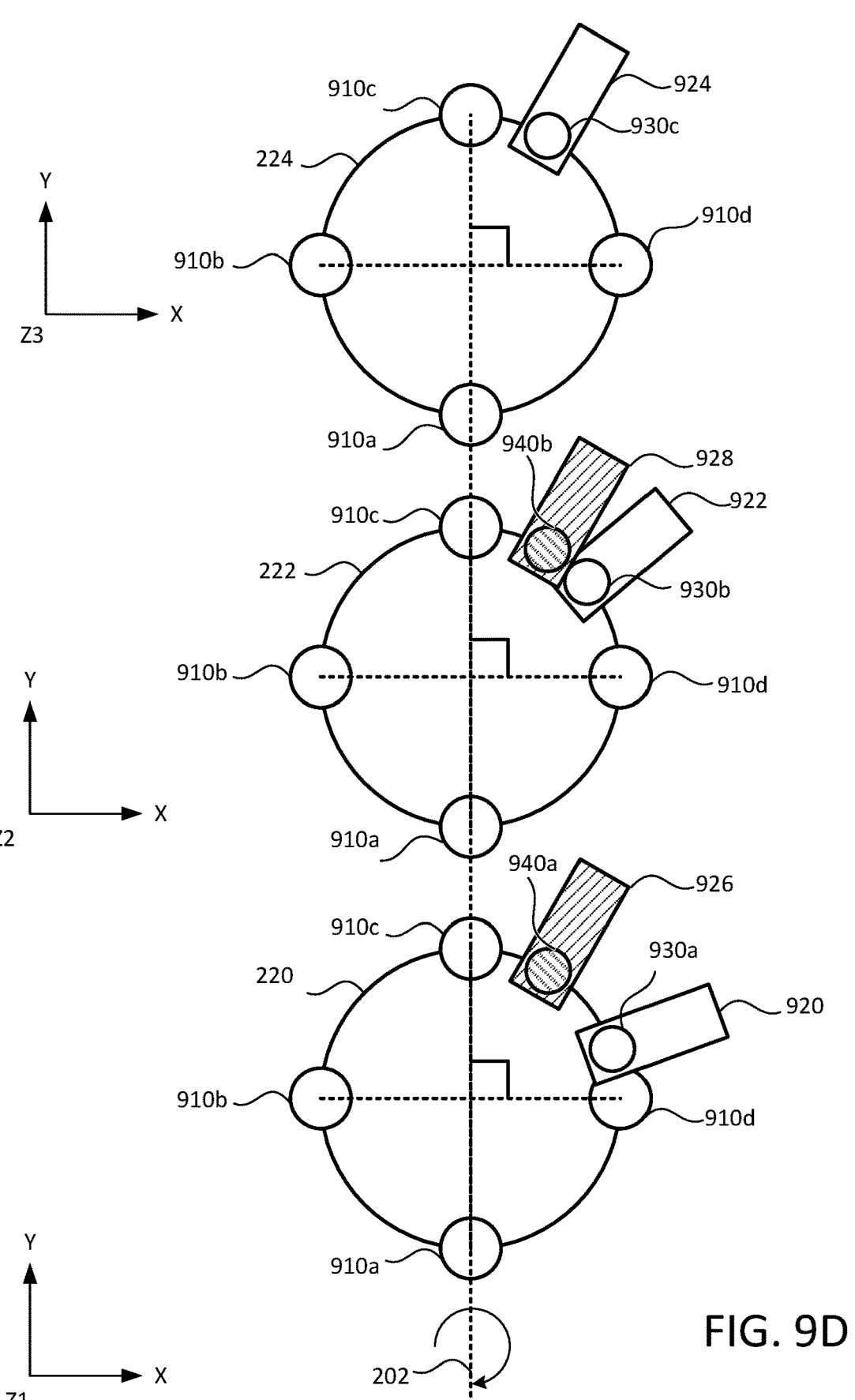
Figures 9E, 9F:
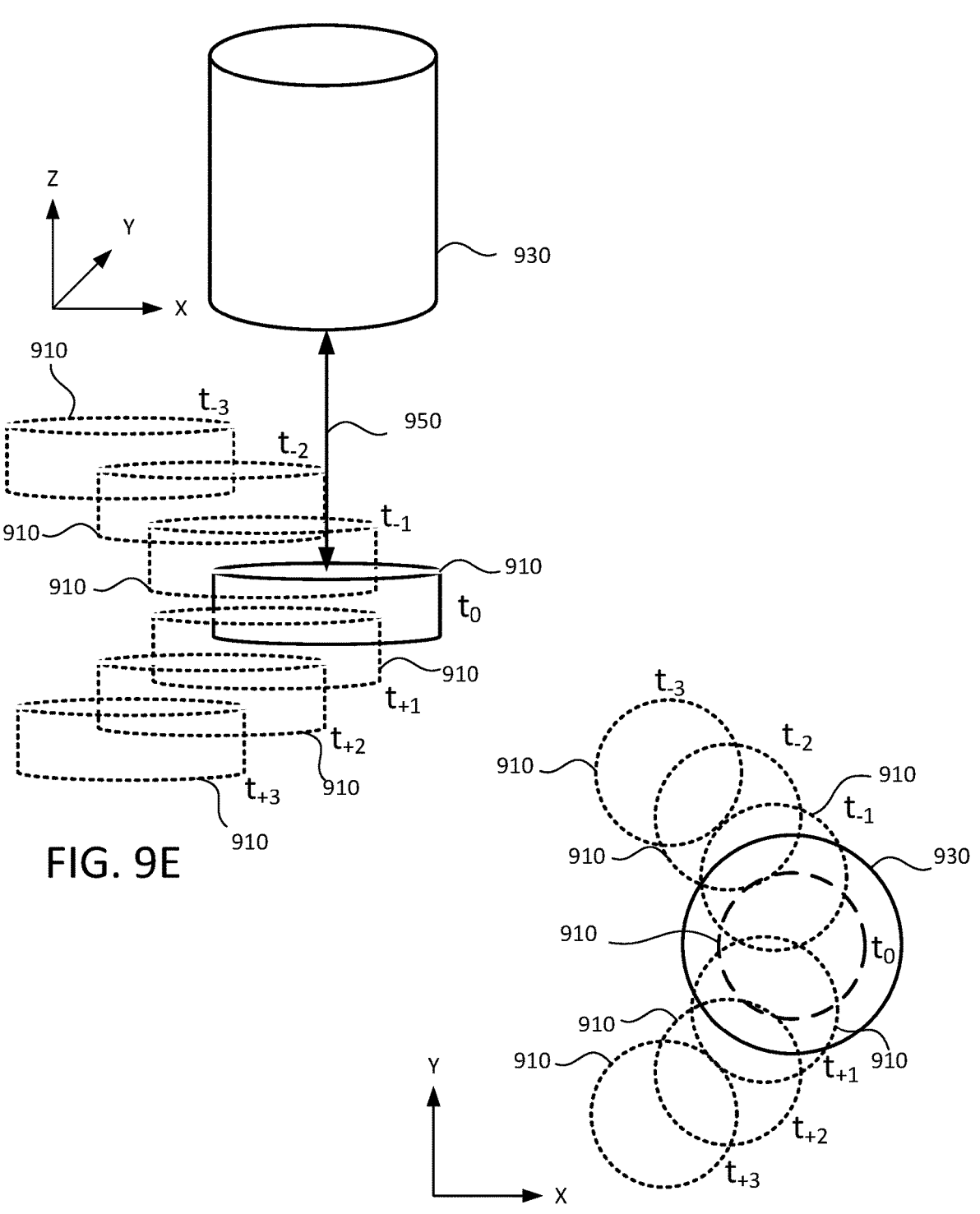

FIGS. 9A-9F provide conceptual diagrams for interactions between elements of the system 100 described herein. FIGS. 9A-9D illustrate several views of an example system 100 from which various elements have been omitted in the drawings to describe interactions between a coil and one or more magnets in a sequentially overlapping arrangements, according to embodiments of the present disclosure. FIGS. 9E and 9F illustrate several views of an interaction between a given coil and magnet over time (e.g., during rotation of the rotor disk about the rotational axis 202) that detail when a magnet and coil can be considered to overlap with one another with respect to a magnetic gap distance, according to embodiments of the present disclosure.

FIGS. 9A and 9B illustrate a ZX planar view of three rotor disks 220, 222, 224 in a stacked arrangement on a shared rotational axis 202 parallel to the Z axis, according to embodiments of the present disclosure. Each rotor disk 220, 222, 224 is illustrated with four magnets 910*a-d* (generally or collectively, magnets 910) that are angularly distributed around the rotational axis 202, which also may be seen in FIGS. 9C and 9D, which show each of the rotor disks 220, 222, 224 in a corresponding XY planar view taken at different positions on the Z axis, where each position in the Z axis may be referred to as a "level" or "layer". In some of the views, the third magnet 910*c* may be obscured.

As used herein, the term "angularly distributed" (and variants thereof) refers to an arrangement of a plurality of components such that each individual component is positioned at a predefined distance from a reference point with an even arc angle between neighboring components. For example, as shown in FIGS. 9A-9C, each rotor disk 220, 222, 224 includes four magnet 910*a-d* that are angularly distributed about the respective rotor disk 220, 222, 224 with respect to a center of that disk (e.g., the rotational axis thereof). In embodiments that include N magnets 910 on a given rotor disk, each magnet 910 is angularly distributed to have 360/N degrees of arc between its neighbors. As there are four magnets 910 in the present example, each is located 90 degrees of arc (e.g., 360/4=90) from the neighboring magnets 910.

The magnets 910*a-d* on each rotor disk 220, 222, 224 are arranged relative to each associated stator 920, 922, 924 and associated coil 930*a-c* to sequentially overlap each magnet 910 of the plurality of magnets 910*a-d* with the associated coils 930*a-c*. in the present example, each of the illustrated coils 930*a-c* are electrically connected to each other in series so that electrical current induced in the first coil 930*a* via rotation of the first rotor disk 220 flows to the second coil 903*b*, which has additional current induced therein via rotation of the second rotor disk 222 and flows to the third coil 930*c*, which has additional current induced therein via rotation of the third rotor disk 224, etc. In other embodiments, two or more coils 930 on the same level may be connected in parallel to one another, and a level may include zero, one, or more than one coil that are included in a set of coils 930 that are electrically connected across different levels.

As used herein, the term "sequentially overlapping" (and variants thereof) describes an arrangement of elements in a generally helical pattern such that neighboring element in in a first level are positioned with an angular offset relative to a corresponding neighboring element in a second level. In the illustrated examples, the corresponding magnets 910*x* (being a specific one of 910*a-d* in each XY plane at levels Z1, Z2, and Z3) on each of the rotor disks 220, 222, 224 are positioned to sequentially overlap with a corresponding coil 930 in a series of coils 930*a-c* in the system 100.

As shown in FIGS. 9A and 9C, the sequential overlap may be achieved by positioning the coils 930*a-c* in a static XY location in each of the different levels of XY planes, but providing an angular offset to the rotor disks 220, 222, 224 relative to one another. The angular offset places the first magnet 910*a* (and all other magnets 910*b-d* relative to their counterparts) in the first rotor disk 220 such that it does not fully overlap with the first magnet 910*a* in the second rotor disk 222, and the first magnet 910*a* in the second rotor disk 222 such that it does not fully overlap with the first magnet 910*a* in the third rotor disk 224. Accordingly, as the rotor disks 220, 222, 224 are rotated at the same angular speed as one another during operation, the first magnet 910*a* on each of the rotor disks 220, 222, 224 overlaps with the corresponding coil 930*a-c* in the series of coils 930 in sequence.

As shown in FIGS. 9B and 9D, the sequential overlap may be achieved by locating the coils 930*a-c* at different angular offsets relative to the rotation axis 202 in each of the different XY planes, and not providing any angular offset to the rotor disks 220, 222, 224 relative to one another. In some embodiments, the angular offsets of the coils 930*a-c* is achieved by changing the physical positions of the various stators 920, 922, 924, in the XY plane. In some embodiments, how the coils 930*a-c* are wired between the levels may affect an angular offset among a plurality coils 930, even if another coil (not part of the plurality) occupies the same XY coordinates at a different level. For example, FIG. 9D illustrates non-linked coil 940*a-b* (held by stators 926, 928) that are not linked in series with coils 930*a-c*, but may be part of a different series of coils connected via different switches. The non-linked coils 940*a-b* may share XY coordinates with coils in the Z1, Z2, and Z3 planes, including members of the linked coils 930*a-c* (e.g., the third coil 930*c* in XY plane Z3). Similarly, each of the coils 930*a-c* may have a counterpart that shares XY coordinates with it in a different level with different Z coordinates. However, because these coils are not electrically connected between levels, the currents induced by each magnet 910*x* on the corresponding level is produced at a slightly different time, despite the rotor disks 220, 222, 224 being rotated at the same angular speed as one another during operation, so that the first magnet 910*a* on each of the rotor disks 220, 222, 224 overlaps with the corresponding coil 930*a-c* in the series of coils 930 in sequence.

Although illustrated in FIGS. 9A-9D with three rotor disks 220. 222, 224, this sequentially overlapping may continue circumferentially and repeat once the applied angular offset (applied to one or more of the positions of the magnet 910 on a given level relative to another level, positions of the coils 930 on a given level relative to another level, or wiring of the coils 930 between levels) results in an overlap with similar components on another level.

FIGS. 9E and 9F illustrate timing diagrams for interaction between a magnet 910 and a coil 930 in an isometric view and a planar view in an XY plane, respectively, according to embodiments of the present disclosure. A magnet 910 is shown rotating about the Z axis in a path that places the magnet 910 at various positions relative to a coil 930. The path is shown from time t–3 to time t+3, where at time to, the magnet 910 is concentrically aligned (along the Z axis) with the coil 930. Because the coil 930 has a larger cross-sectional area than the magnet 910 in the present examples, the magnet 910 is considered to be fully overlapped by the coil 930 at time to, but at least a portion of the magnet 910 is overlapped by the coil 930 at time t–2, time t–1, time t+1, and time t+2. At times t–3 and time t+3, the coil 930 does not overlap the magnet 910.

As used herein, the term "overlap" (and variations thereof) refers to a relationship between two components are disposed in different planes from one another such that when a first component occupies a set of planar coordinates (e.g., XY coordinates) that at least a portion of the second component also occupies, albeit in a different plane, those two components are considered to overlap. When all of the portions of the first component occupy planar coordinates that are also occupied by the second component, the first component is set to be fully overlapped by the second component. When some, but not all, of the portions of the first component occupy planar coordinates that are also occupied by the second component, the first component is set to be partially overlapped by the second component. For example, at time t0 in FIG. 4E, the magnet 910 is fully overlapped by the coil 930, whereas the coil 930 is partially overlapped by the magnet 910. Unless stated otherwise, the overlap is determined according to a rotational perspective for the system 100, such that the planes used to assess whether various components overlap one another are all perpendicular to the rotational axis 202 for the system 100.

The coil 930 and the magnet 910 are positioned so that when they overlap, they are separated by a magnetic gap distance 950. As used herein, the magnetic gap distance 950 (and variations thereof) refers to a distance between overlapping portions of a magnet 910 and a coil 930 measured in the direction that the coil 930 axially extends (e.g., on a Z axis in the illustrated examples) relative to the rotor and parallel to the rotational axis 202. In various embodiments, the size of the magnetic gap distance 950 may vary based on the magnetic strength of the magnets 910 used, the size of the magnets 910 used, the desired strength of current that the design calls for the magnet 910 to induce in the coil 930, the speed of rotation about the rotational axis 202, the magnetic permeability of any intervening material between the magnet 910 and the coil 930, etc.

Aspects of the subject matter described herein may be useful alone or in combination with one or more other aspects described herein, and may be understood with reference to the following numbered clauses.

Clause 1: A device comprising: a rotor disk configured to rotate about a rotational axis; a plurality of magnets disposed in the rotor disk, the plurality of magnets angularly distributed around the rotational axis, and the plurality of magnets magnetically aligned such that respective magnetic north poles of each magnet of the plurality of magnets face a same direction; and a coil disposed adjacent to the rotor disk, the coil extending axially away from the rotor disk, and the coil positioned to sequentially overlap each magnet of the plurality of magnets in response to rotation of the rotor disk about the rotational axis.

Clause 2: The device of any of clauses 1 and 3-13, further comprising a magnetic core disposed inside the coil.

Clause 3: The device of any of clauses 1-2 and 4-13, further comprising a wall disposed outside and adjacent to the coil, the wall formed from a magnetic material, wherein the wall and the magnetic core have a same magnetic permeability.

Clause 4: The device of any of clauses 1-3 and 5-13, further comprising: a stator magnet disposed adjacent to the coil and extending from a proximal end that faces the rotor disk to a distal end of the stator magnet opposite the proximal end of the stator magnet, wherein a first magnetic pole of the stator magnet is at the proximal end of the stator magnet facing the rotor disk.

Clause 5: The device of any of clauses 1-4 and 6-13, wherein the stator magnet is aligned such that the first magnetic pole has a same polarity as respective magnetic poles of the plurality of magnets that face the coil during rotation of the rotor disk about the rotational axis.

Clause 6: The device of any of clauses 1-5 and 7-13, wherein the stator magnet has a round shape at the proximal end of the stator magnet facing the rotor disk.

Clause 7: The device of any of clauses 1-6 and 8-13, further comprising: a stator disposed adjacent to the rotor disk, the stator shaped to receive and support the coil, and the stator positioned to define a magnetic gap distance between the coil and the rotor disk while the rotor disk is rotating about the rotational axis.

Clause 8: The device of any of clauses 1-7 and 9-13, wherein the stator is a stator disk extending around the rotational axis.

Clause 9: The device of any of clauses 1-8 and 10-13, wherein the stator flexibly mounts the coil relative to the rotor disk to vary the magnetic gap distance in response to movement of the coil during rotation of the rotor disk about the rotational axis.

Clause 10: The device of any of clauses 1-9 and 11-13, further comprising: a plurality of coils, the plurality of coils disposed adjacent to the rotor disk, each respective coil of the plurality of coils extending axially away from the rotor disk from a respective proximal end of the respective coil facing the rotor disk to a respective distal end of the respective coil opposite the respective proximal end, and each coil of the plurality of coils positioned to sequentially overlap each magnet of the plurality of magnets in response to rotation of the rotor disk about the rotational axis.

Clause 11: The device of any of clauses 1-10 and 12-13, wherein the coil is a first coil of the plurality of coils, wherein the first coil is disposed adjacent to a first side of the rotor disk, and wherein a second coil of the plurality of coils is disposed adjacent to a second side of the rotor disk opposite the first side.

Clause 12: The device of any of clauses 1-11 and 13, wherein the first coil is electrically connected in series with the second coil.

Clause 13: The device of any of clauses 1-12, wherein the coil is electrically connected in parallel with another coil of the plurality of coils.

Clause 14: A system comprising: one or more rotor disks configured to rotate about a rotational axis, wherein each of the one or more rotor disks includes a respective plurality of magnets angularly distributed about the rotational axis; a plurality of coils, each respective coil of the plurality of coils positioned when overlapping one magnet of the plurality of magnets on a respective rotor disk of the one or more rotor disks to be within a magnetic gap threshold of the one magnet, the respective coil extending axially from a proximal end of the respective coil facing the respective disk to a distal end of the respective coil opposite the proximal end; a load bus configured to transport electrical power; a plurality of switches, each of the plurality of switches having a respective switch output that is electrically connected to the load bus; and a controller coupled to the plurality of switches and configured to selectively connect at least one of the plurality of coils to the load bus by operating the plurality of switches.

Clause 15: The system of any of clauses 14 and 16, wherein the controller is configured to select the at least one of the plurality of coils based on one or more of: measurements of load level at the load bus; expected characteristics of a load connected to the load bus; predetermined characteristics of the plurality of coils; and a time-of-day.

Clause 16: The system of any of clauses 14-15, further comprising a converter disposed between the load bus and at least one of the plurality of switches to convert Alternating Current (AC) current output from at least one of the plurality of coils into a Direct Current (DC) current input into the load bus.

Clause 17: A system, comprising: a plurality of rotor disks, including: a first rotor disk including a first plurality of magnets angularly distributed relative to a rotation axis; a second rotor disk including a second plurality of magnets angularly distributed relative to the rotation axis; a plurality of coils, including: a first coil positioned to be within a magnetic gap distance of each magnet of the first plurality of magnets; and a second coil positioned to be within the magnetic gap distance of each magnetic of the second plurality of magnets; and wherein the first rotor disk and the first coil are positioned relative to the second rotor disk and the second coil to sequentially overlap the first plurality of magnets with the first coil relative overlapping the second plurality of magnets with the second coil while rotating the first rotor disk and the second rotor disk at shared rotational speed about the rotation axis.

Clause 18: The system of any of clauses 17, 19, and 20, wherein each magnet of the first plurality of magnets is positioned with a non-zero angular offset relative to a corresponding magnetic from the second plurality of magnets, and wherein the first coil fully overlaps the second coil.

Clause 19: The system of any of clauses 17, 18, and 20, wherein each magnetic of the first plurality of magnets is positioned to fully overlap a corresponding magnet from the second plurality of magnets and the first coil is positioned with a non-zero angular offset relative to the second coil.

Clause 20: The system of any of clauses 17-19, further comprising: a third coil that fully overlaps the first coil and is positioned to be within the magnetic gap distance of each magnetic of the second plurality of magnets; wherein the first coil is wired in series with the second coil and is connected to a load bus via a first switch, different from a second switch that connects the third coil to the load bus.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A device comprising:
a rotor disk configured to rotate about a rotational axis;
a plurality of magnets disposed in the rotor disk, the plurality of magnets angularly distributed around the rotational axis; and
a coil disposed adjacent to the rotor disk, the coil extending axially away from the rotor disk, and the coil positioned to sequentially overlap each magnet of the plurality of magnets in response to rotation of the rotor disk about the rotational axis, wherein the coil is positioned to overlap with a single magnet of the plurality of magnets on the rotor disk at any given time to be within a magnetic gap threshold of the one single magnet.

2. A system comprising:
one or more rotor disks configured to rotate about a rotational axis, wherein each of the one or more rotor disks includes a respective plurality of magnets angularly distributed about the rotational axis;
a plurality of coils, each respective coil of the plurality of coils positioned to overlap with a single magnet of the plurality of magnets on a respective rotor disk of the one or more rotor disks at any given time to be within a magnetic gap threshold of the single magnet, the respective coil extending axially from a proximal end of the respective coil facing the respective disk to a distal end of the respective coil opposite the proximal end in a direction parallel to the rotational axis;
a load bus configured to transport electrical power;
a plurality of switches, each of the plurality of switches having a respective switch output that is electrically connected to the load bus; and
a controller coupled to the plurality of switches and configured to selectively connect at least one of the plurality of coils to the load bus by operating the plurality of switches.

3. The system of claim 2, wherein the controller is configured to select the at least one of the plurality of coils based on one or more of:
measurements of load level at the load bus;
expected characteristics of a load connected to the load bus;
predetermined characteristics of the plurality of coils; and
a time-of-day.

4. The system of claim 2, further comprising a converter disposed between the load bus and at least one of the plurality of switches to convert Alternating Current (AC) current output from at least one of the plurality of coils into a Direct Current (DC) current input into the load bus.

5. The system of claim 2, wherein the respective plurality of magnets for each of the one or more rotor disks includes magnets that are aligned so that magnetic north poles of the magnets each face a same direction, and wherein the one or more rotor disks comprise a first rotor disk and a second rotor disk that are configured to rotate at a shared rotational speed about the rotation axis.

6. The system of claim 2, further comprising a plurality of magnetic cores each magnetic core of the plurality of magnetic cores disposed inside a respect coil of the plurality of coils.

7. The system of claim 6, further comprising a wall disposed outside and adjacent to the plurality of coils, the wall formed from a magnetic material, wherein the wall and the plurality of magnetic cores have a same magnetic permeability.

8. The system of claim 2, further comprising:
a plurality of stator magnets each stator magnet disposed adjacent to a respective coil of the plurality of coil and extending from the proximal end to the distal end, wherein a first magnetic pole of the stator magnet is at the proximal end facing the respective rotor disk.

9. The system of claim 8, wherein each stator magnet of the plurality of stator magnets is aligned such that the first magnetic pole has a same polarity as respective magnetic poles of the plurality of magnets that face the plurality of coil during rotation of the respective rotor disk about the rotational axis.

10. The system of claim 8, wherein the each stator magnet of the plurality of stator magnets has a round shape at the proximal end facing the respective rotor disk.

11. The system of claim 2, further comprising:
a stator disposed adjacent to the rotor disk, the stator shaped to receive and support the plurality of coils, and the stator positioned to define the magnetic gap distance between the plurality of coils and the rotor disk while the rotor disk is rotating about the rotational axis.

12. The system of claim 11, wherein the stator is a stator disk extending around the rotational axis.

13. The system of claim 11, wherein the stator flexibly mounts the plurality of coils relative to the respective rotor disk to vary the magnetic gap distance in response to movement of the plurality of coils during rotation of the respective rotor disk about the rotational axis.

14. The system of claim 2, wherein a first coil of the plurality of coils is electrically connected in series with a second coil of the plurality of coils, wherein the first coil and the second coil are arranged on one side of the respective rotor risk.

15. The system of claim 2, wherein a first coil of the plurality of coils is electrically connected in series with a second coil of the plurality of coils, wherein the first coil and the second coil are arranged on opposing sides of the respective rotor risk.

16. The system of claim 2, wherein a first coil of the plurality of coils is electrically connected in parallel with a second coil of the plurality of coils, wherein the first coil and the second coil are arranged on one side of the respective rotor risk.

17. The system of claim 2, wherein a first coil of the plurality of coils is electrically connected in parallel with a second coil of the plurality of coils, wherein the first coil and the second coil are arranged on opposing sides of the respective rotor risk.

18. A system, comprising:
a plurality of rotor disks, including:
a first rotor disk including a first plurality of magnets angularly distributed relative to a rotation axis;
a second rotor disk including a second plurality of magnets angularly distributed relative to the rotation axis;
a plurality of coils, including:
a first coil positioned to be within a magnetic gap distance of each magnet of the first plurality of magnets, wherein the first coil is positioned to overlap with a single magnet of the first plurality of magnets on the first rotor disk at any given time to be within the magnetic gap threshold of the single magnet of the first plurality of magnets; and
a second coil positioned to be within the magnetic gap distance of each magnetic of the second plurality of magnets, wherein second first coil is positioned to overlap with a single magnet of the second plurality of magnets on the second rotor disk at any given time to be within the magnetic gap threshold of the single magnet of the first plurality of magnets; and
wherein the first rotor disk and the first coil are positioned relative to the second rotor disk and the second coil to sequentially overlap the first plurality of magnets with the first coil relative to overlapping the second plurality of magnets with the second coil while rotating the first rotor disk and the second rotor disk at shared rotational speed about the rotation axis.

19. The system of claim 18, wherein each magnet of the first plurality of magnets is positioned with a non-zero angular offset relative to a corresponding magnetic from the second plurality of magnets, and wherein the first coil fully overlaps the second coil.

20. The system of claim 18, wherein each magnetic of the first plurality of magnets is positioned to fully overlap a corresponding magnet from the second plurality of magnets and the first coil is positioned with a non-zero angular offset relative to the second coil.

21. The system of claim 19, further comprising:
a third coil that fully overlaps the first coil and is positioned to be within the magnetic gap distance of each magnetic of the second plurality of magnets;
wherein the first coil is wired in series with the second coil and is connected to a load bus via a first switch, different from a second switch that connects the third coil to the load bus.

* * * * *